(12) United States Patent
Dorogusker

(10) Patent No.: US 11,270,304 B2
(45) Date of Patent: Mar. 8, 2022

(54) BIOMETRIC PAYMENT TECHNOLOGY

(71) Applicant: Square, Inc., San Francisco, CA (US)

(72) Inventor: Jesse Dorogusker, Palo Alto, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/339,744

(22) Filed: Oct. 31, 2016

(65) Prior Publication Data

US 2020/0410500 A1 Dec. 31, 2020

Related U.S. Application Data

(63) Continuation of application No. 14/985,130, filed on Dec. 30, 2015, now Pat. No. 9,519,901.

(60) Provisional application No. 62/219,515, filed on Sep. 16, 2015.

(51) Int. Cl.
*G06Q 20/40* (2012.01)
*G06Q 20/20* (2012.01)
*G06Q 20/32* (2012.01)

(52) U.S. Cl.
CPC ......... *G06Q 20/401* (2013.01); *G06Q 20/202* (2013.01); *G06Q 20/3226* (2013.01); *G06Q 20/40145* (2013.01)

(58) Field of Classification Search
CPC ......... G06Q 20/40145; G06Q 20/3226; G06Q 20/3224; G06Q 20/401; G06Q 20/202
USPC ........................................................ 705/75
See application file for complete search history.

(56) References Cited

U.S. PATENT DOCUMENTS

| 5,870,723 | A  | * | 2/1999  | Pare, Jr | G06Q 20/18 |
|           |    |   |         |          | 705/39     |
| 5,960,411 | A  |   | 9/1999  | Hartman et al. | |
| 6,167,517 | A  |   | 12/2000 | Gilchrist et al. | |
| 6,192,142 | B1 | * | 2/2001  | Pare, Jr | G06K 9/6255 |
|           |    |   |         |          | 382/115    |

(Continued)

FOREIGN PATENT DOCUMENTS

| AU | 2017228647 A1 | 10/2017 |
| CA | 2 906 524 A1  | 9/2014  |

(Continued)

OTHER PUBLICATIONS

Schneier, B., "Protocol Building Blocks," in Applied Cryptography—Second Edition—Protocols, Algorithms and Source Code in C, Chapter-2, pp. 37-38, Phil Sutherland, Katherine Schowalter (1996).

(Continued)

*Primary Examiner* — John W Hayes
*Assistant Examiner* — Edgar R Martinez-Hernandez
(74) *Attorney, Agent, or Firm* — Lee & Hayes, P.C.

(57) ABSTRACT

In some examples, methods and systems may process one or more payment transactions between a merchant and a customer by registering, by a biometric sensor of a payment object reader or a mobile device, a biometric characteristic as a biometric payment instrument, for example by obtaining data corresponding to a biometric characteristic of the customer. The data is converted into a digital signature of the biometric characteristic and compared with a registered biometric instrument at the time of transaction. If a match is obtained, the customer effects payments through the registered biometric instrument.

9 Claims, 7 Drawing Sheets

(56) References Cited

U.S. PATENT DOCUMENTS

| | | | |
|---|---|---|---|
| 6,243,689 B1* | 6/2001 | Norton | G06Q 20/04 705/18 |
| 6,310,966 B1* | 10/2001 | Dulude | H04L 9/3247 382/115 |
| 6,532,541 B1* | 3/2003 | Chang | G06T 1/0028 380/216 |
| 6,705,520 B1 | 3/2004 | Pitroda et al. | |
| 6,738,749 B1 | 5/2004 | Chasko | |
| 6,760,841 B1 | 7/2004 | Fernandez | |
| 6,763,399 B2 | 7/2004 | Margalit et al. | |
| 7,020,778 B1 | 3/2006 | Miettinen et al. | |
| 7,069,240 B2 | 6/2006 | Spero et al. | |
| 7,249,092 B2 | 7/2007 | Dunn et al. | |
| 7,305,129 B2 | 12/2007 | Chellapilla et al. | |
| 7,949,609 B2 | 5/2011 | Colella | |
| 8,135,624 B1 | 3/2012 | Ramalingam et al. | |
| 8,498,900 B1 | 7/2013 | Spirin et al. | |
| 8,645,222 B1 | 2/2014 | Tamassia et al. | |
| 8,769,556 B2* | 7/2014 | Guo | H04H 60/45 725/10 |
| 8,924,259 B2 | 12/2014 | Neighman et al. | |
| 9,037,491 B1 | 5/2015 | Lee | |
| 9,292,852 B2 | 3/2016 | Coulter et al. | |
| 9,519,901 B1* | 12/2016 | Dorogusker | G06Q 20/202 |
| 9,576,159 B1 | 2/2017 | Templeton et al. | |
| 9,622,074 B2 | 4/2017 | Lee | |
| 9,626,669 B2 | 4/2017 | Lee | |
| 9,721,123 B1 | 8/2017 | Wade | |
| 9,741,026 B1 | 8/2017 | Grassadonia et al. | |
| 9,754,255 B1 | 9/2017 | Ma et al. | |
| 9,760,883 B1 | 9/2017 | Wade | |
| 10,062,074 B1 | 8/2018 | Zigoris | |
| 10,147,076 B2 | 12/2018 | Zhou et al. | |
| 10,163,092 B2 | 12/2018 | Barrett | |
| 10,182,328 B1 | 1/2019 | Maibach et al. | |
| 10,242,357 B1 | 3/2019 | Dorogusker et al. | |
| 10,318,952 B1 | 6/2019 | Wade et al. | |
| 10,373,184 B1 | 8/2019 | Kim et al. | |
| 10,373,186 B1 | 8/2019 | Kim et al. | |
| 10,552,841 B1 | 2/2020 | Dixit | |
| 10,572,868 B2 | 2/2020 | Barrett | |
| 10,607,231 B1 | 3/2020 | Cohn et al. | |
| 10,740,748 B2 | 8/2020 | Zigoris | |
| 2002/0152180 A1 | 10/2002 | Turgeon | |
| 2003/0208386 A1 | 11/2003 | Brondrup | |
| 2003/0212609 A1 | 11/2003 | Blair et al. | |
| 2004/0029569 A1 | 2/2004 | Khan et al. | |
| 2004/0059924 A1* | 3/2004 | Soto | G06F 21/33 713/186 |
| 2004/0143527 A1 | 7/2004 | Benkert et al. | |
| 2006/0047576 A1 | 3/2006 | Aaltonen et al. | |
| 2006/0206506 A1 | 9/2006 | Fitzpatrick | |
| 2006/0265602 A1* | 11/2006 | Robinson | G06Q 20/04 713/186 |
| 2007/0069013 A1 | 3/2007 | Seifert et al. | |
| 2008/0040233 A1 | 2/2008 | Wildman et al. | |
| 2008/0041937 A1 | 2/2008 | Vawter | |
| 2008/0046366 A1 | 2/2008 | Bemmel et al. | |
| 2008/0126260 A1 | 5/2008 | Cox et al. | |
| 2008/0167961 A1 | 7/2008 | Wentker et al. | |
| 2008/0189214 A1* | 8/2008 | Mueller | G06Q 20/3823 705/65 |
| 2008/0215475 A1 | 9/2008 | Ramer et al. | |
| 2008/0319869 A1 | 12/2008 | Carlson et al. | |
| 2009/0043696 A1 | 2/2009 | Ornce et al. | |
| 2009/0065571 A1 | 3/2009 | Jain | |
| 2009/0157547 A1 | 6/2009 | Ruckart | |
| 2009/0159663 A1 | 6/2009 | Mullen et al. | |
| 2009/0187466 A1 | 7/2009 | Carter et al. | |
| 2009/0187488 A1 | 7/2009 | Shamilian | |
| 2009/0187492 A1 | 7/2009 | Hammad et al. | |
| 2009/0228325 A1 | 9/2009 | Simmons et al. | |
| 2009/0307140 A1 | 12/2009 | Mardikar | |
| 2009/0313101 A1 | 12/2009 | McKenna et al. | |
| 2009/0327135 A1 | 12/2009 | Nguyen et al. | |
| 2010/0019033 A1 | 1/2010 | Jolivet | |
| 2010/0030651 A1 | 2/2010 | Matotek et al. | |
| 2010/0082445 A1 | 4/2010 | Hodge et al. | |
| 2010/0138344 A1 | 6/2010 | Wong et al. | |
| 2010/0169179 A1 | 7/2010 | Ramer et al. | |
| 2010/0191551 A1 | 7/2010 | Drance et al. | |
| 2010/0293065 A1 | 11/2010 | Brody et al. | |
| 2011/0184822 A1 | 7/2011 | Matkovic | |
| 2011/0307342 A1 | 12/2011 | Haji | |
| 2012/0010938 A1 | 1/2012 | Standley et al. | |
| 2012/0048922 A1 | 3/2012 | Godager | |
| 2012/0109818 A1 | 5/2012 | Carlson et al. | |
| 2012/0143707 A1 | 6/2012 | Jain | |
| 2012/0158580 A1 | 6/2012 | Eram et al. | |
| 2012/0197743 A1* | 8/2012 | Grigg | G06Q 20/32 705/16 |
| 2012/0253852 A1 | 10/2012 | Pourfallah et al. | |
| 2012/0290421 A1 | 11/2012 | Qawami et al. | |
| 2012/0331134 A1 | 12/2012 | Lynn et al. | |
| 2013/0132274 A1* | 5/2013 | Henderson | G06Q 20/4012 705/41 |
| 2013/0173475 A1* | 7/2013 | Lund | G06Q 20/32 705/67 |
| 2013/0198076 A1 | 8/2013 | Zambelli Hosmer et al. | |
| 2013/0218721 A1* | 8/2013 | Borhan | G06Q 20/3224 705/26.41 |
| 2013/0232073 A1* | 9/2013 | Sheets | H04L 9/3231 705/44 |
| 2013/0267200 A1* | 10/2013 | Weiner | G06Q 20/3278 455/411 |
| 2014/0058858 A1 | 2/2014 | Stecewycz | |
| 2014/0058862 A1 | 2/2014 | Celkonas | |
| 2014/0058865 A1 | 2/2014 | Yang et al. | |
| 2014/0188586 A1 | 7/2014 | Carpenter et al. | |
| 2014/0222596 A1* | 8/2014 | S | G06Q 20/206 705/18 |
| 2015/0081556 A1 | 3/2015 | Neighman et al. | |
| 2015/0088750 A1* | 3/2015 | Dua | G06Q 20/20 705/44 |
| 2015/0088755 A1* | 3/2015 | Sobel | G06Q 20/327 705/71 |
| 2015/0120557 A1* | 4/2015 | Zhang | G06Q 20/40145 705/44 |
| 2015/0154588 A1 | 6/2015 | Purves et al. | |
| 2015/0161597 A1 | 6/2015 | Subramanian et al. | |
| 2015/0317638 A1* | 11/2015 | Donaldson | G06Q 20/40145 705/44 |
| 2016/0005020 A1 | 1/2016 | Fernando et al. | |
| 2016/0048821 A1* | 2/2016 | Sprecher | G06Q 20/22 705/16 |
| 2016/0125415 A1* | 5/2016 | Mardikar | G06K 9/00013 705/44 |
| 2016/0125416 A1 | 5/2016 | Spencer et al. | |
| 2016/0210626 A1 | 7/2016 | Ortiz et al. | |
| 2016/0217279 A1* | 7/2016 | Scully-Power | H04W 12/068 |
| 2016/0314465 A1* | 10/2016 | Martin | G06Q 20/20 |
| 2016/0364730 A1* | 12/2016 | Rans | G06Q 20/40145 |
| 2017/0017958 A1 | 1/2017 | Scott et al. | |
| 2017/0046679 A1 | 2/2017 | Gotlieb et al. | |
| 2017/0161733 A1 | 6/2017 | Koletsky et al. | |
| 2018/0082319 A1 | 3/2018 | Wen et al. | |
| 2018/0150846 A1 | 5/2018 | Maheshwari et al. | |
| 2018/0253727 A1 | 9/2018 | Ortiz et al. | |
| 2018/0293573 A1 | 10/2018 | Ortiz et al. | |
| 2019/0057377 A1 | 2/2019 | Zigoris | |
| 2019/0318355 A1 | 10/2019 | Chopra et al. | |
| 2019/0354981 A1 | 11/2019 | Neighman et al. | |

FOREIGN PATENT DOCUMENTS

| | | |
|---|---|---|
| EP | 1 764 680 A2 | 3/2007 |
| JP | 2002-99858 A | 4/2002 |
| JP | 2003-150885 A | 5/2003 |
| JP | 2005-321873 A | 11/2005 |
| JP | 2009-86832 A | 4/2009 |
| JP | 2009-226689 A | 10/2009 |
| JP | 2011-197511 A | 10/2011 |

(56) References Cited

FOREIGN PATENT DOCUMENTS

| | | | |
|---|---|---|---|
| JP | 2013-97657 A | 5/2013 |
| JP | 2013-238977 A | 11/2013 |
| JP | 2017-510903 A | 4/2017 |
| KR | 10-2011-0019887 A | 3/2011 |
| KR | 10-2012-0133706 A | 6/2012 |
| KR | 10-2012-0074497 A | 7/2012 |
| WO | 2011/156884 A1 | 12/2011 |
| WO | 2014/151582 A1 | 9/2014 |
| WO | 2015/100385 A1 | 7/2015 |

OTHER PUBLICATIONS

Notice of Allowance dated Aug. 18, 2016, for U.S. Appl. No. 14/985,130, of Dorogusker, J., filed Dec. 30, 2015.
"Card Reader," FullContact Developer API, last modified on Jun. 14, 2013, Retrieved from the Internet URL: https://web.archive.org/web/20130615043655/http://www.fullcontact.com/developer/docs/card-reader, on Sep. 29, 2015, pp. 1-8.
Friedman, T.D., "The Authorization Problem in Shared Files," IBM Systems Journal, vol. 9, Issue 4, Dec. 1970, pp. 258-280.
Goode, L., "Paying With Square's New Mobile-Payments App," All Things D, Apr. 30, 2012, Retrieved from the Internet URL: http://allthingsd.com/20120430/paying-with-squares-new-mobile-payments-app/, pp. 1-6.
Grove, V. J., "How Square's New Pay-With-Your-Name System Works," Mashable, May 23, 2011, Retrieved from the Internet URL: http://mashable.com/2011/05/23/square-card-case/#_, on Sep. 10, 2014, pp. 1-17.
Grove, V. J., "Square Announces New Consumer Initiative: Pay with your name," Mashable, May 23, 2011, Retrieved from the Internet URL: http://mashable.com/2011/05/23/square-pay-with-name/, on Sep. 10, 2014, pp. 1-23.
Morrow, S. E., "Pay-by-name purchasing: changing the future of spending," Kmov.comSt.Louis, Dec. 29, 2011, Retrieved from the Internet URL: http://www.kmov.com/news/technology/Pay-by-name-purchasing-changing-the-future-of-spending-136411238.html, on Sep. 10, 2014, pp. 1-5.
Roland, M., "Software Card Emulation in NFC-enabled Mobile Phones: Great Advantage or Security Nightmare?," Fourth International Workshop on Security and Privacy in Spontaneous Interaction and Mobile Phone Use (IWSSI/SPMU), Newcastle, UK, Jun. 18, 2012, pp. 1-6.
"Square-Pay-by-Name," Pay with your phone! Square Card case frees you of credit cards, Youtube.com, Retrieved from the Internet URL: https://www.youtube.com/watch?v=d3CYigOjx8o, Posted on Sep. 7, 2011, AppJudgment, pp. 1-15.
Non Final Office Action dated Feb. 26, 2014, for U.S. Appl. No. 13/831,103, of Neighman, D., et al., filed Mar. 14, 2013.
Non-Final Office Action dated Jul. 10, 2014, for U.S. Appl. No. 14/187,049, of Lee, R., filed Feb. 21, 2014.
Final Office Action dated Sep. 25, 2014, for U.S. Appl. No. 14/187,049, of Lee, R., filed Feb. 21, 2014.
Advisory Action dated Oct. 17, 2014, for U.S. Appl. No. 14/187,049, of Lee, R., filed Feb. 21, 2014.
Notice of Allowance dated Oct. 20, 2014, for U.S. Appl. No. 13/831,103, of Neighman, D., etal., filed Mar. 14, 2013.
Notice of Allowance dated Feb. 27, 2015, for U.S. Appl. No. 14/187,049, of Lee, R., filed Feb. 21, 2014.
Non-Final Office Action dated May 18, 2015, for U.S. Appl. No. 14/667,496, of Lee, R., filed Mar. 24, 2015.
Final Office Action dated Aug. 21, 2015, for U.S. Appl. No. 14/667,496, of Lee, R., filed Mar. 24, 2015.
Advisory Action dated Oct. 8, 2015, for U.S. Appl. No. 14/667,496, of Lee, R., filed Mar. 24, 2015.
Non-Final Office Action dated Feb. 5, 2016, for U.S. Appl. No. 14/667,496, of Lee, R., filed Mar. 24, 2015.
Non-Final Office Action dated Jun. 1, 2016, for U.S. Appl. No. 14/667,496, of Lee, R., filed Mar. 24, 2015.
Non-Final Office Action dated Jun. 16, 2016, for U.S. Appl. No. 14/502,703, of Grassadonia, B., et al., filed Sep. 30, 2014.
Examination Report No. 1 for Australian Patent Application No. 2014233712, dated Sep. 15, 2016.
Examination Report No. 1 for Australian Patent Application No. 2014369891, dated Nov. 3, 2016.
Examiner Requisiton for Canadian Patent Application No. 2,906,524, dated Nov. 4, 2016.
Notice of Allowance dated Dec. 9, 2016, for U.S. Appl. No. 14/667,496, of Lee, R., filed Mar. 24, 2015.
Final Office Action dated Dec. 29, 2016, for U.S. Appl. No. 14/502,703, of Grassadonia, B., et al., filed Sep. 30, 2014.
Notice of Acceptance for Australian Patent Application No. 2014369891, dated Feb. 21, 2017.
Examiner Requisition for Canadian Patent Application No. 2,935,177, dated Apr. 7, 2017.
Notice of Allowance dated Apr. 20, 2017, for U.S. Appl. No. 14/502,703, of Grassadonia, B., et al., filed Sep. 30, 2014.
Non-Final Office Action dated Jul. 3, 2017, for U.S. Appl. No. 15/365,637, of Zigoris, P., filed Nov. 30, 2016.
English translation of Notification of Reasons for Refusal for Japanese Patent Application No. 2016-561596, dated Oct. 13, 2017.
Notice of Allowance for Canadian Patent Application No. 2906524, dated Nov. 16, 2017.
Final Office Action dated Jan. 4, 2018, for U.S. Appl. No. 15/365,637, of Zigoris, P., filed Nov. 30, 2016.
Non-Final Office Action dated Jan. 25, 2018, for U.S. Appl. No. 14/550,382, of Neighman, D., et al., filed Nov. 21, 2014.
Examiner Requisition for Canadian Patent Application No. 2,935,177, dated Feb. 28, 2018.
Advisory Action dated Apr. 9, 2018, for U.S. Appl. No. 15/365,637, of Zigoris, P., filed Nov. 30, 2016.
Notice of Allowance dated Apr. 23, 2018, for U.S. Appl. No. 15/365,637, of Zigoris, P., filed Nov. 30, 2016.
Final Office Action dated Aug. 7, 2018, for U.S. Appl. No. 14/550,382, of Neighman, D., et al., filed Nov. 21, 2014.
Non-Final Office Action dated Aug. 13, 2018, for U.S. Appl. No. 14/984,931, of Dorogusker, J., filed Dec. 30, 2015.
Examination Report No. 1 for Australian Patent Application No. 2017228647, dated Sep. 28, 2018.
English translation of Notification of Reasons for Refusal for Japanese Patent Application No. 2016-561596, dated Oct. 5, 2018.
Advisory Action dated Nov. 15, 2018, for U.S. Appl. No. 14/550,382, of Neighman, D., et al., filed Nov. 21, 2014.
Final Office Action dated Dec. 14, 2018, for U.S. Appl. No. 14/984,931, of Dorogusker, J., filed Dec. 30, 2015.
Non Final Office Action dated Jan. 5, 2019, for U.S. Appl. No. 14/550,382, of Neighman, D., et al., filed Nov. 21, 2014.
International Search Report and Written Opinion in International Patent Application No. PCT/US2014/026038, dated Jul. 7, 2014.
International Search Report and Written Opinion for International Patent Application No. PCT/US2014/072285, dated Mar. 31, 2015.
Extended European Search Report for European Patent Application No. 14875157.1, dated Jul. 14, 2017.
English translation of Search Report for Japanese Patent Application No. 2016-561596, dated Sep. 7, 2017.
"Secure Code FAQs," BankSA, Retrieved from the Internet URL: http://web.archive.org/web/20121005105958/https://www.banksa.com.au/online-services/security-centre/we-protect-you/banksa-secure/secure-code-faqs, on Oct. 5, 2012, p. 1.
English-language translation of Decision to Grant a Patent for Japanese Patent Application No. 2016-561596, dated Jan. 18, 2019.
Notice of Allowance for Canadian Patent Application No. 2,935,177, dated Jan. 22, 2019.
Second Examination Report for Australian Patent Application No. 2017228647, dated Mar. 12, 2019.
Advisory Action dated Mar. 21, 2019, for U.S. Appl. No. 14/984,931, of Dorogusker, J., filed Dec. 30, 2015.
Third Examination Report for Australian Patent Application No. 2017228647, dated Apr. 18, 2019.
Notice of Allowance dated Apr. 24, 2019, for U.S. Appl. No. 14/550,382, of Neighman, D., et al., filed Nov. 21, 2014.

(56) References Cited

OTHER PUBLICATIONS

Non-Final Office Action dated Jun. 3, 2019, for U.S. Appl. No. 14/984,931, of Dorogusker, J., filed Dec. 30, 2015.
Non-Final Office Action dated Jun. 27, 2019, for U.S. Appl. No. 15/675,099, of Grassadonia, B., filed Aug. 11, 2017.
Final Office Action dated Sep. 9, 2019, for U.S. Appl. No. 14/984,931, of Dorogusker, J., filed Dec. 30, 2015.
European Search Report dated Sep. 20, 2019, in European Patent Application No. 14 875 157.1, of Lee, R., filed Dec. 23, 2014.
Non-Final Office Action dated Oct. 21, 2019, for U.S. Appl. No. 16/111,026, of Zigoris, P., filed Aug. 23, 2018.
First Examination Report for Australian Patent Application No. 2019240563, dated Nov. 22, 2019.
Non-Final Office Action dated Jan. 16, 2020, for U.S. Appl. No. 14/984,931, of Dorogusker, J., filed Dec. 30, 2015.
Non-Final Office Action dated Feb. 14, 2020, for U.S. Appl. No. 15/675,099, of Grassadonia, B., et al., filed Aug. 11, 2017.
Notice of Allowance dated Mar. 18, 2020, for U.S. Appl. No. 16/111,026, of Zigoris, P., filed Aug. 23, 2018.
Non-Final Office Action dated May 19, 2020, for U.S. Appl. No. 16/120,133, of Blackie, S., et al., filed Aug. 31, 2018.
"Application programming interface—Wikipedia", XP055671378, Retrieved from the Internet URL: https://en.wikipedia.org/w/index.php?title=Application_programming_interface&oldid=587766714#API_and_protocols, on Jun. 26, 2020, pp. 1-8.
Non-Final Office Action dated Jul. 9, 2020, U.S. Appl. No. 16/120,095, of Blackie, S., et al., filed Aug. 31, 2018.
Summons to Attend Oral Proceedings for European Patent Application No. 14 875 157.1, mailed Jun. 24, 2020.
Examination Report No. 2 for Australian Patent Application No. 2019240563, dated Jul. 13, 2020.
Final Office Action dated Aug. 19, 2020, for U.S. Appl. No. 14/984,931, of Dorogusker, J., filed Dec. 30, 2015.
Final Office Action dated Aug. 21, 2020, for U.S. Appl. No. 15/675,099, of Grassadonia, B., et al., filed Aug. 11, 2017.

* cited by examiner

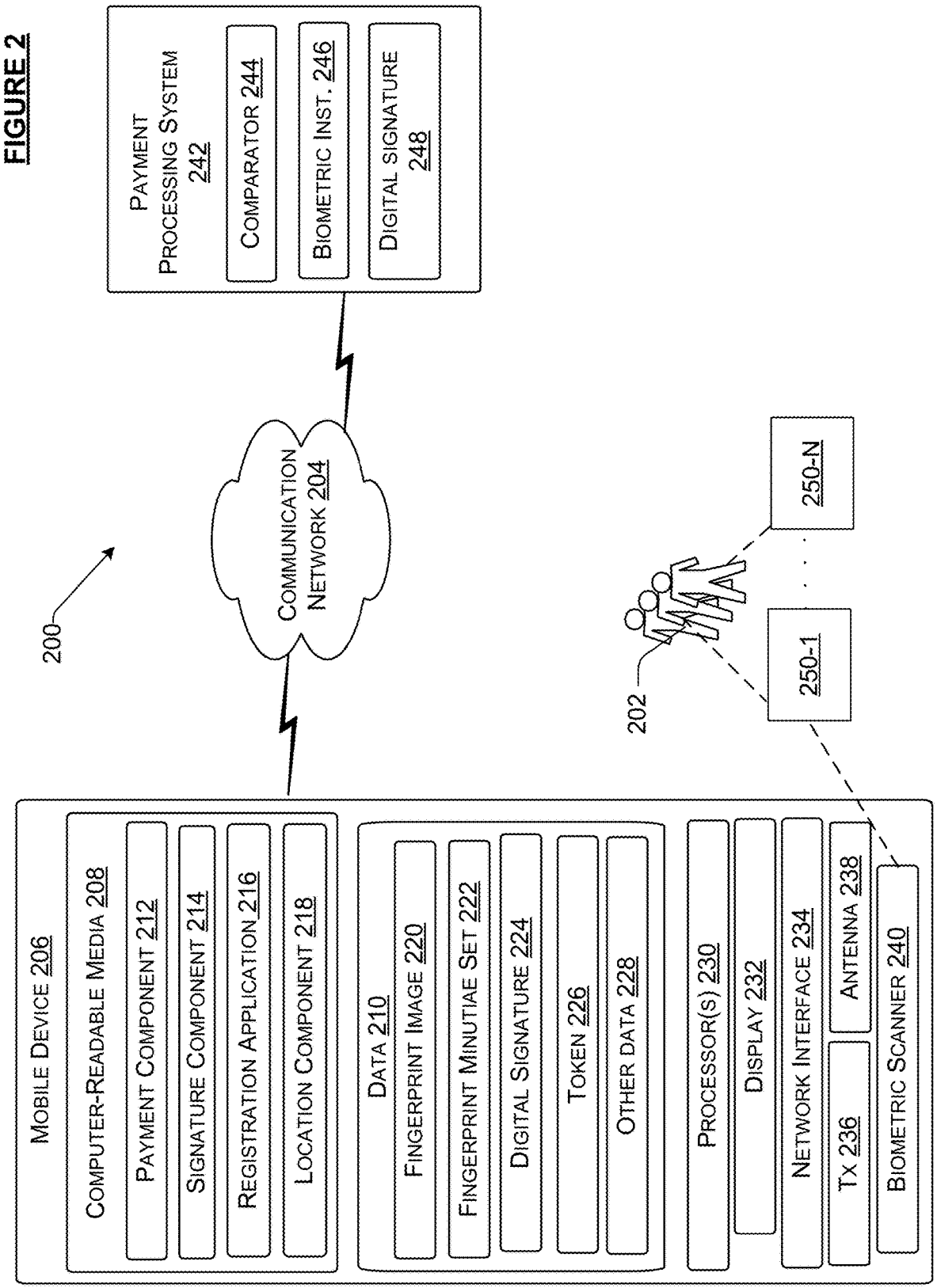

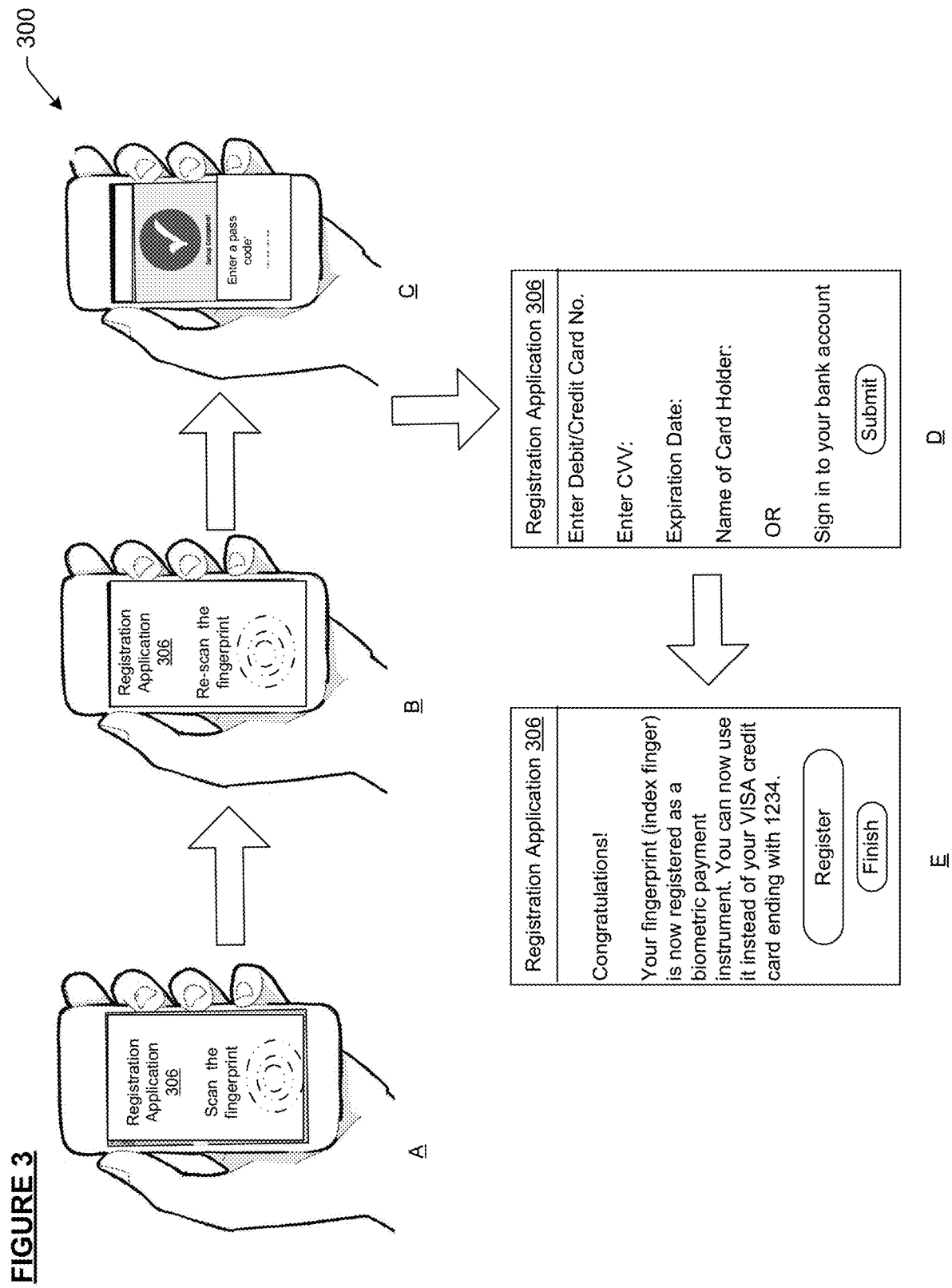

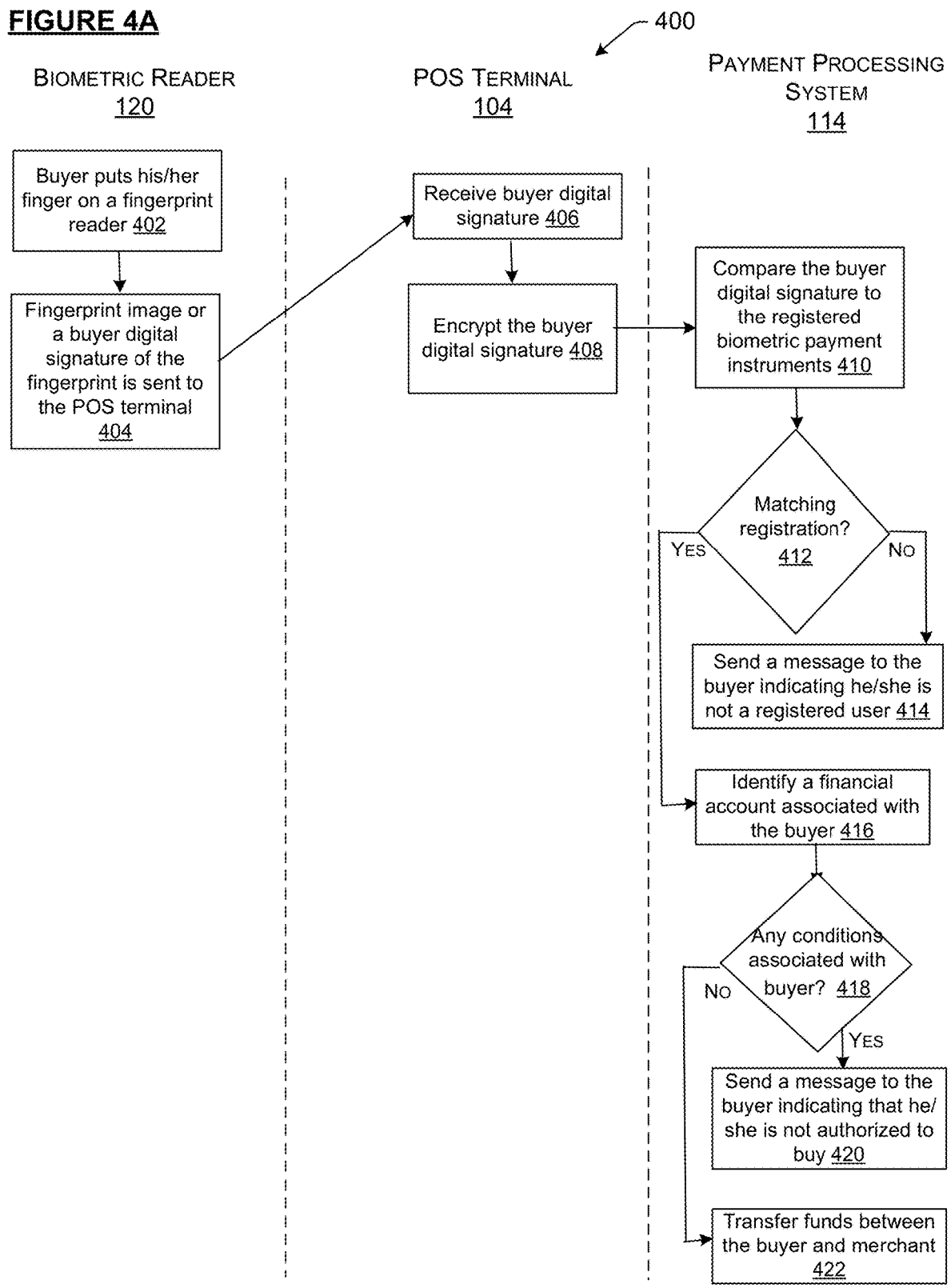

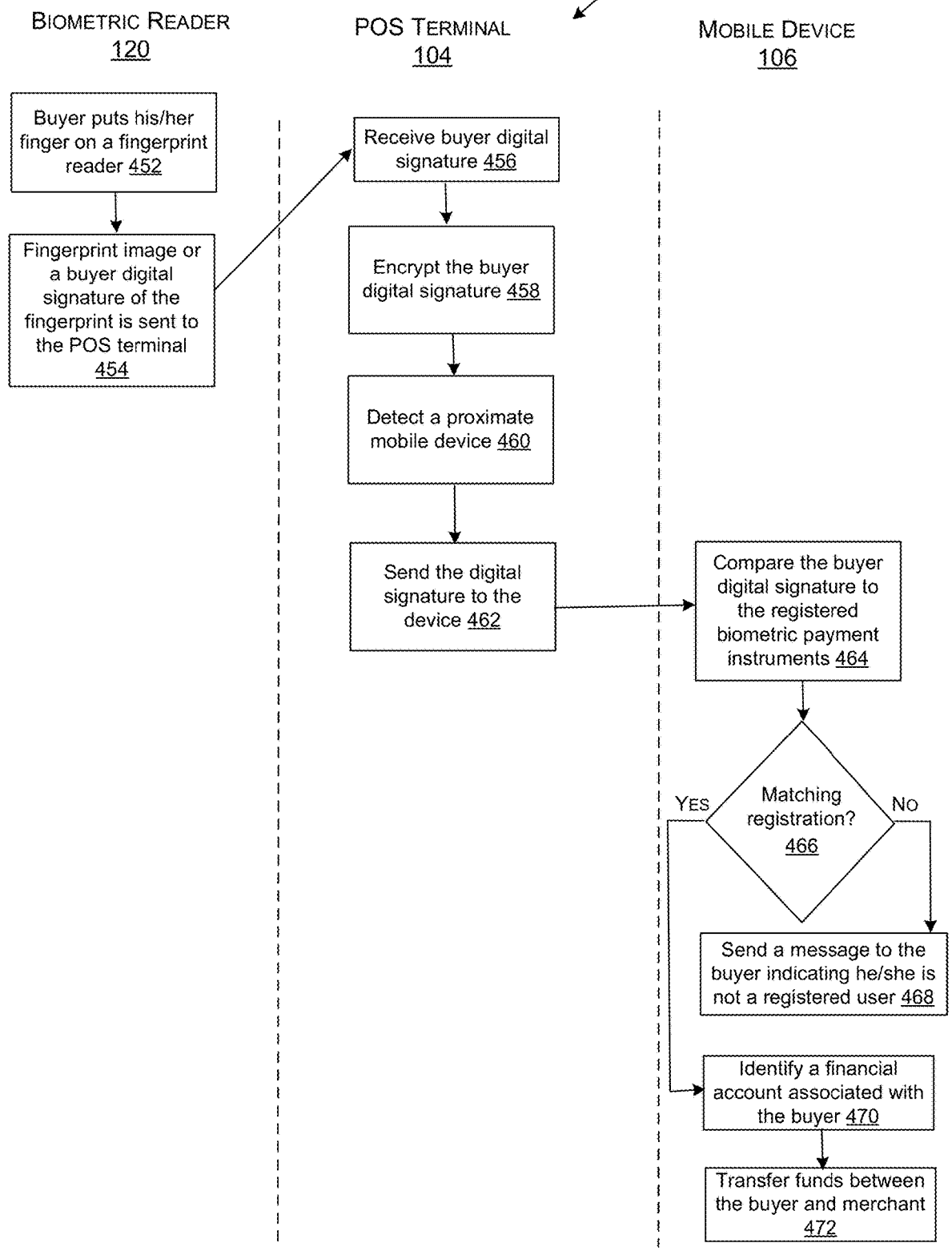

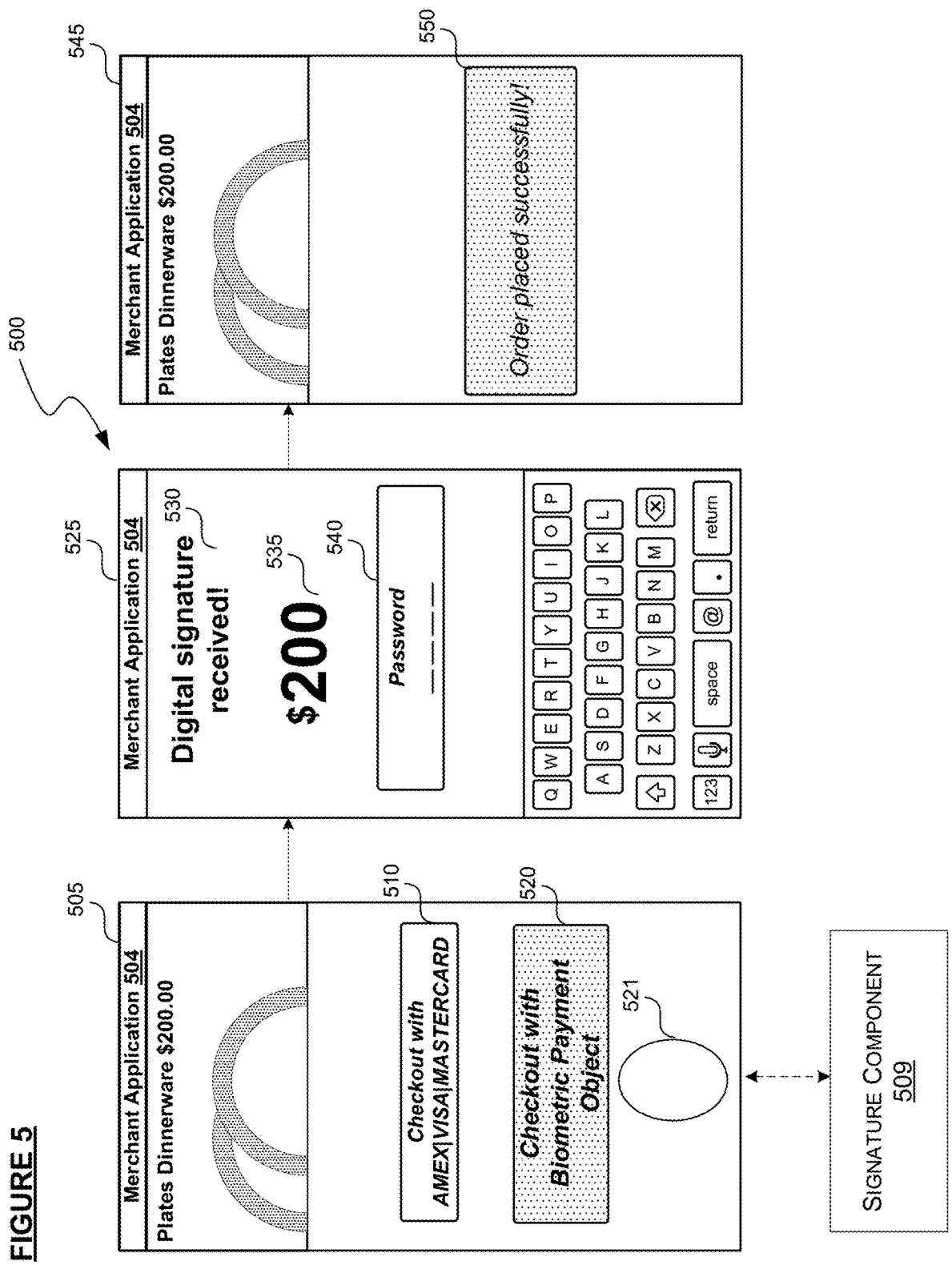

BIOMETRIC PAYMENT TECHNOLOGY

CROSS REFERENCE TO RELATED APPLICATIONS

This application is a continuation application of and claims priority to U.S. patent application Ser. No. 14/985,130, filed on Dec. 30, 2015, now pending, which claims priority to U.S. Provisional Patent Application No. 62/219,515, filed on Sep. 16, 2015, titled "Biometric Payment Technology," the entire contents of all of which are incorporated herein by reference.

TECHNICAL FIELD

Generally, a merchant requests a customer to provide a payment card (e.g., a credit card or a debit card) to pay for a product or service. The merchant inserts or taps the payment card onto a card reader connected to a point-of-sale terminal, which facilitates processing of an electronic payment transaction between the merchant and the customer.

For security purposes, the merchant generally requests the customer to present a proof of identification along with the payment card. The method of verification is usually in the form of a government issued identity card, billing address associated with the payment card, a security code of the payment card, social security number of the customer, phone number of the customer, or a combination of all. However, these modes of verification simply confirm that the customer has physical possession of the payment card, and not necessarily that the customer is the true owner of the card or is even authorized to use the card.

In the absence of reliable payment instruments, and verification and authentication of such instruments, fraudulent payment transactions have been on the rise, as fraudsters can fraudulently obtain complete information about a payment card including personal identifying information, passwords, and PIN.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

FIG. 2 is a block diagram illustrating registration of biometric characteristics as a method of payment using a mobile device, according to an embodiment of the present subject matter.

FIG. 3 illustrates a data flow method of registering a customer's biometric characteristic as payment instrument with a payment processor, according to an embodiment of the present subject matter.

FIG. 4A is a flowchart illustrating a method of processing a payment transaction paid using a biometric payment instrument, according to an embodiment of the present subject matter.

FIG. 4B is a flowchart illustrating a method of processing a payment transaction paid using a biometric payment instrument, according to another embodiment of the present subject matter.

FIG. 5 is a block diagram that illustrates an example purchase flow using a biometric payment object, according to an embodiment of the present subject matter.

DETAILED DESCRIPTION

Figure 1:
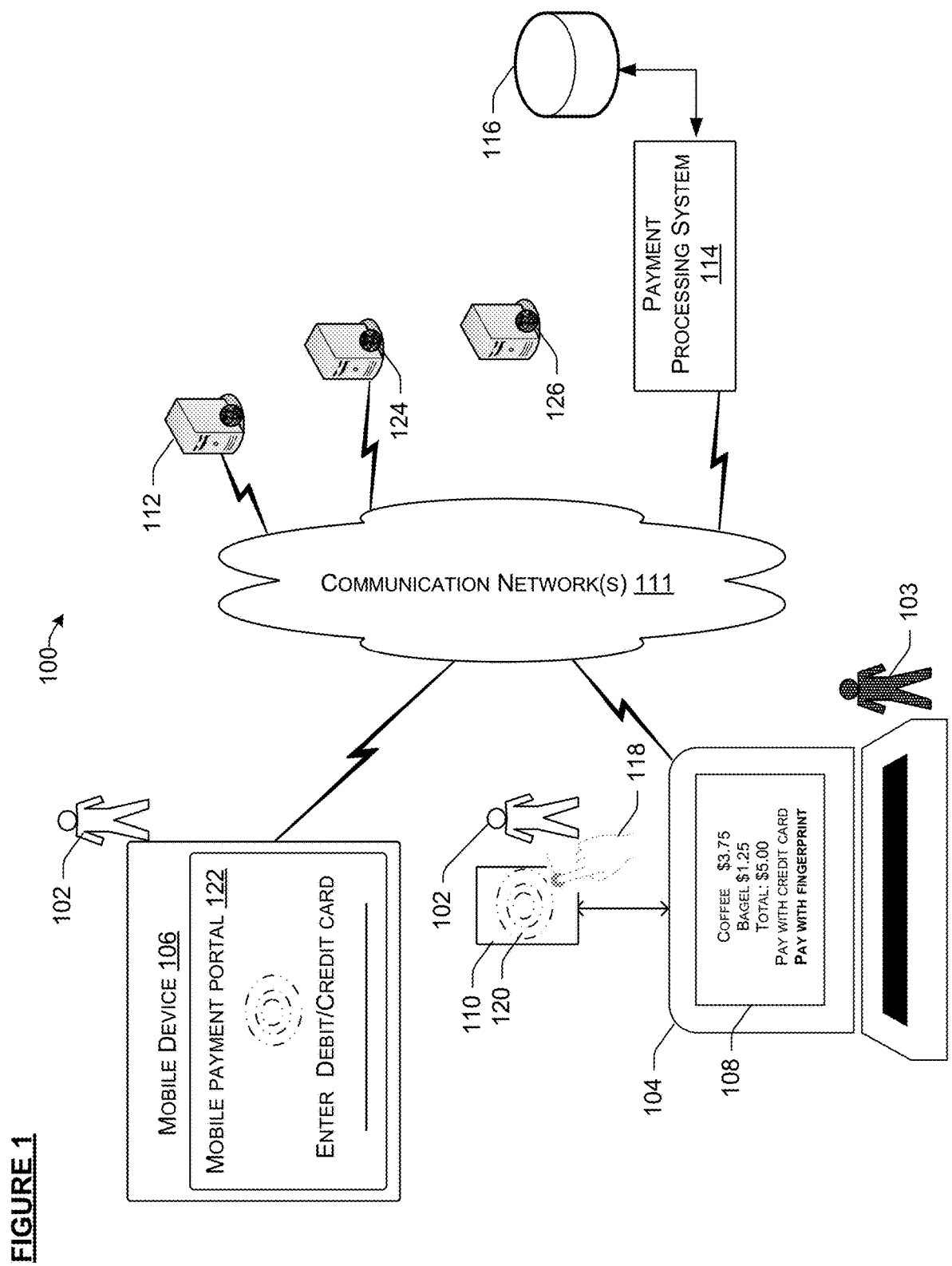
FIG. 1 is a network environment illustrating interaction between a point-of-sale (POS) terminal and a payment object reader, which can receive a biometric characteristic, for example a fingerprint, as a method of payment, according to an embodiment of the present subject matter.

Some implementations described herein include methods and systems that enable customers to register biometric characteristics as biometric payment instruments, and subsequently allow the registered biometric payment instrument to be used towards a payment transaction between a customer and a merchant. At the time of payment transaction, the systems and methods authenticate the biometric payment instrument and securely and reliably process the customer's transaction by retrieving the customer's financial account associated and registered with the biometric instrument.

Generally, a payment transaction involves a customer providing a payment card, such as a credit card or debit card, to pay for a product or service that the customer purchases from a merchant. The credit card is swiped or dipped into a card reader, which is connected to or included within a point-of-sale (POS) terminal. The POS terminal generates a payment request in response to the swiping action and based on the data collected from the credit card. The POS terminal electronically sends the payment request to a payment card processor over an available network for authorization. The payment card processor, with or without performing an analysis of the payment request, routes the request to a card network, e.g., Visa® or MasterCard®, which in turn sends the request to the card issuer, e.g., a bank, for approval. Usually, after a short delay, the POS terminal may receive an indication of whether the payment card has been approved (i.e., authorized) or declined (i.e., failed to authorize) for an amount of the transaction, such as a cost of the good or service. Assuming the card issuer approves the transaction, the payment card processor causes funds to be transferred from the customer's bank account to a merchant's bank account, and optionally creates a receipt indicating successful processing of a payment transaction, which is sent to a customer's phone.

Traditionally, the payment card, such as a debit card or credit card, is authorized by an issuing bank. Such a payment card can be generally used for three types of "in-store" credit card transactions, i.e., "customer signature required", "no customer signature required" and self check-out. In all such transactions, the customer is prompted to sign a signature pad, which marks the completion of the credit card transaction. For Internet or telephone credit card transactions, online customers place desired item(s) in an online shopping cart and once all item(s) have been selected, the customer selects the option to checkout the online shopping cart. On selecting credit card as a method of payment, the customer is prompted to enter a special PIN number imprinted on the back of the card for verification purposes. Similarly, transactions made on automatic or unmanned machines allow the customer to purchase a product or service but asks the customer to provide a proof of identity or verification, either in the form of signature or PIN number.

One of the problems with all such existing credit card transactions is that once the card is activated, it remains that way until the card is reported lost or stolen or the account is canceled or closed. During this time, any fraudulent party that gets access to the credit card information can use the credit card to their benefit and continue to do so until the owner of the credit card finds out and reports. While anti-fraud techniques, such as holograms, photo IDs, and signature matching are somewhat successful, such techniques still do not establish, with certainty, that the card holder is indeed the card owner. Further, these techniques are difficult to implement in some cases, e.g., for Internet payment transactions in which the customer is physically unavailable to provide confirmation.

To avoid such risks, technology is disclosed herein for methods and systems to register one or more biometric instruments (e.g., such as a person's fingerprint, thumbprint, face, iris or retina, etc., or in general, hand characteristics, eye characteristics, facial characteristics, voice characteristics) as a payment instrument with a payment processing system, and then effecting payment transactions using the registered biometric instruments at any merchant location. The customer can also use the registered biometric instrument using a biometric reader associated with the customer device, e.g., mobile phone, thereby effectively converting a customer device into a POS terminal. In some implementations, the customer need not provide any identification or use any personal device at the time of payment. The customer provides a biometric characteristic, e.g., fingerprint, retina scan, etc., as payment instrument at a merchant location and walks out with a product or service after successful payment with the biometric characteristic.

While the description hereinafter discusses biometric instruments with fingerprint as an example biometric characteristic, it will be understood that any other instrument that uniquely identifies the customer may be registered. The unique instrument, when registered, enables the customer to pay for a product or service without serving physical accessories, like a passport or driver's license, to prove their identity. Owing to the unique and personalized nature of the biometric instrument, payment transactions are less vulnerable to frauds. The use of biometric instruments makes it virtually impossible to feign or replicate the actual payment instrument. Further, the payment process using the biometric payment instruments is friction-less, easier, more efficient, and more convenient especially when compared to traditional methods of payment through physical objects, e.g., cards, etc. Further, according to the present subject matter, it is possible to read prints of one specific finger for example, thumb, the ring finger, middle finger, pinky, index-finger (any of the fingers of the hand), or a combination thereof.

In one implementation, the customer registers his fingerprint at the time of purchase, e.g., at the merchant's location, using the card reader provided for receiving a payment instrument. The card reader, through a biometric sensor, receives the fingerprint (either as an image or a set of points) and computes a digital signature, for example, by adding a token to the received fingerprint. Examples of token include, for example, a security key, one-time password, or other dynamically generated token. At this time, the card reader may also request for financial information from the customer. The customer either manually enters the card details, swipes the card, or scans the card using a scanner therein. The card reader uploads the card information and connects the fingerprint with the card information, e.g., in a look-up table locally accessible via the card reader. This process registers the customer's biometric characteristic as biometric payment instrument at that merchant location. The next time customer purchases a product or service at the merchant's location using the card reader, the customer can use the registered biometric payment instrument since the card information is available in the local look-up table.

Instead of locally storing the digital signatures, the card reader can store the registered biometric instruments on a server accessible via local area network, or even to a remote server to allow merchants from various locations to access the biometric instrument.

The registration process can also happen in the following manner: the customer may enroll by providing a number of samples of the respective biometric. From these samples, the biometric system may create a model of the particular individual's patterns, which is referred to as a template. When the person attempts to access the system, the application collects new data. In a verification application, the individual may claim an identity, and the application retrieves the individual's model from a database and compares the new data to the retrieved model. The result of this comparison is generally termed a match score indicating how well the new signal matches the template. The application then compares the match score obtained with a pre-defined threshold and decides whether to allow or deny access to the individual or, for example, to ask the individual for more data.

In another implementation, the customer registers his fingerprint on his personal mobile device, using a biometric scanner provided with the mobile phone. The mobile device, through a biometric sensor, receives the fingerprint (either as an image or a set of points) and computes a digital signature by, for example, by adding a token to the received fingerprint. Examples of a token include, for example, a security key, one-time password, or other dynamically generated token. At this time, the mobile device may also request for financial information from the customer. The customer either manually enters the card details, swipes the card, or scans the card using a scanner therein. The mobile device uploads the card information (tokenized, for example) and connects the fingerprint with the card information, e.g., in a look-up table locally accessible via the mobile device, e.g., through a secure enclave technology. This process registers the customer's biometric characteristic as biometric payment instrument. The next time customer purchases a product or service at any merchant's location using the card reader, the customer can use the registered biometric payment instrument. At this time, the merchant's POS terminal, connected to the card reader, detects, e.g., through geofences or other location detection technology, with reasonable certainty a mobile device in proximity to the card reader. The POS terminal sends a notification to the mobile device to confirm the payment transaction, that is to authorize by re-entering the fingerprint on their respective device, the tokenized version of which is temporarily sent to the POS terminal and/or card reader. Alternatively, the mobile device can push a pre-stored digital signature or biometric instrument onto the requesting device after authorization.

If the mobile device belongs to the customer, the digital signature from the mobile device matches with the received fingerprint at the card reader and the payment transaction is fulfilled by extracting bank information embedded in the digital signature. Instead of locally storing the digital signatures on the mobile device, the mobile device can store the registered biometric instruments on a server accessible via local area network, or even to a remote server to allow merchants from various locations to access the biometric instrument.

In another variation, the fingerprint or its representation, is pushed onto the mobile device instead of the other way around. When the customer provides his fingerprint, the fingerprints are compared by the mobile device before a payment transaction is authorized. The confirmation is then pushed to the POS terminal, along with tokenized payment information to further processing of transactions. In some cases, the mobile device may send the payment request to the payment processor on behalf of the merchant.

In yet another implementation, the fingerprint or the digital signature is stored in a central server after registration and also sent to the server at the time of authorization of a payment transaction. The mapping between the signature and the financial information also occurs at the central server or payment processor level. Thus, when the customer provides his fingerprint at the merchant location, the customer's fingerprint or a representation of it (e.g., tokenized) is sent to the payment processor, which both confirms the identity of the customer and based on that determination, retrieves the financial information (provided at the time of registration) and fulfills the payment transaction accordingly.

As described above, the disclosed technology enhances the checkout experience for customers by removing account registration and sign-in barriers. Because the disclosed technology uses mapping or association between a biometric payment instrument and one or more payment cards or bank accounts to process payment requests from merchant systems, customers provide minimal information to complete the checkout process. Moreover, the disclosed technology enables the checkout process to be completed in a shorter amount of time with or without using a single verification action. The friction-less purchasing technology reduces the overall interaction time and payment flow to less than 10 seconds by removing the need to register, sign-in, or presenting credit card or debit card every single time. Furthermore, the geo-fence based technology enables detection of the computing device within a certain distance from the POS terminal, allowing the user to store the biometric payment locally and authorize with a single tap or click.

While the embodiments described herein may relate to brick-and-mortar retails stores using POS terminals, including self-checkout terminals, it will be understood that the embodiments can be extended to shopping at any e-commerce location, including online shopping via merchant websites or applications.

Various embodiments and implementations of the disclosed purchasing technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant, for example through a biometric payment instrument.

As used herein, a 'payment transaction' or simply 'transaction' may include a financial transaction for the acquisition of goods and/or services that is conducted between a customer and a merchant. For example, when paying for a transaction, the customer can provide the amount that is due to the merchant using a payment proxy. In other cases, the payment transaction includes transfer of money from one party to another for any number of reasons. Thus, while the description refers to as customer and merchant as parties to the payment transaction, it will be understood that the parties can be a sender and a recipient, a land lord and a renter, a bank and a bank customer, a first friend and a second friend, and so on.

The term 'payment card' or 'payment object' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term 'proxy card' as used herein refers to a card that may or may not bear a card number or an account number that appears to be that of a real credit or debit card account (i.e., it is in the correct format), but where that card/account number is actually only a proxy for the customer's real card/account number. Additionally, the payment card used in the example above is a specific type of a financial instrument. Other types of financial instruments, other than the payment card, can be used to initiate the transfer of funds. A financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the customer or merchant's financial account. The payment proxy can be used in the context of and within a webpage as part of the web address, a social networking handle or username, a forum, a messaging application, and so on.

The term 'biometric payment instrument' is a type of payment object or financial instrument that is biometrically identifiable and initialized by a biometric characteristic, such as a person's finger (e.g., for fingerprint recognition), face, iris or retina, heartbeat, voice, etc.

The term "landing page," as used here, refers to a virtual location identified by a personalized location address that is dedicated to collect payments on behalf of a recipient associated with the personalized location address. The personalized location address can include the payment proxy discussed above. In some embodiments, the landing page is identified by a uniform resource locator (URL) that includes a payment proxy, where the URL is accessible through a web browser application installed on a client device of the sender.

For example, the URL is www . . . com/$charityName. In another example, the URL is www . . . com/$aaron. In some embodiments, the landing page is identified by a graphical user interface (GUI) of a mobile payment application installed on a client device of the sender. For example, the GUI of the mobile payment application is dedicated to $charityName, where there can be multiple GUIs each dedicated to a different payment proxy.

The landing page is generated by the payment service system to receive, e.g., collect, one or more payments on behalf of the recipient from one or more senders. The sender can access the landing page, e.g., by entering a URL into a web browsing application installed on the sender's client device. Upon navigating to the URL, the sender can simply enter a payment amount, e.g., in a web form field, and send the money, e.g., by selecting a "Pay" action button displayed on the website. In another example, the sender can access the landing page, e.g., by selecting a GUI within a mobile payment service application, where the GUI, e.g., is labeled with the payment proxy $aaron. The sender can further enter a payment amount at the GUI and send the money, e.g., by selecting a "Pay" action button displayed on the GUI.

The term "forum," as used here, refers to a media channel (e.g., a social networking website, a microblog, a blog, etc.) that enables user interaction and engagement through comments, posts, and/or messages. The forum can be employed by a service provider to provide various services to users of the forum, e.g., create messages, post comments, interact with one another, etc. Within a forum context, a user can indicate an intent to transfer money by specifying a payment proxy in a message that the user submits, e.g., "posts," on a particular forum, where that payment proxy carries the syntax of the monetary indicator preceding one or more alphanumeric characters. For example, the user posts a message "I support $funnyguy311 with $10." In such an example, the payment service system detects the user's intent to send money, e.g., $10, to "$funnyguy311" and initiates the transfer of money upon identification of a recipient financial account associated with "$funnyguy311." The monetary indicator can correspond to various currencies, e.g., dollar ($), euro (€), pound (£), yuan (¥), etc. Although use of the dollar monetary indicator ($) is used herein, it is to be understood that any currency symbol could equally be used.

The term "registration application" or "mobile payment portal" as used here, refers to any messaging application that enables communication between users (e.g., sender and recipient of a message) over a wired or wireless communications network. A service provider that delivers a communication service to users, e.g., chat capability, can employ the messaging application. The messaging application can include, for example, a text messaging application for communication between phones (e.g., conventional mobile telephones or smartphones), or a cross-platform instant messaging application for smartphones and phones that use the Internet for communication. Within a messaging application context, a user can indicate an intent to transfer money by specifying a payment proxy in a TO field of, e.g., a message, that the user inputs within the messaging application. For example, the user enters into the TO field "$redcross." In another example, the user enters into the TO field "$aaron." Once the user enters a payment proxy, or input, into the TO field, the user can enter a message in a body of the message, e.g., "Here is $10," and send the message. In various embodiments, the message can be a text message, a chat message, an email message, or indeed any other type of message that is capable of being exchanged between computing devices. Although this specification may employ text messages as an example, it is to be understood that the payment proxy technology may employ any of these types of messages. Upon receiving an indication to send (e.g., after detecting that the user has clicked "Send"), the messaging application transmits a message, e.g., the text message to a messaging application computer system ("messaging application system"). The messaging application system detects that the input in the TO field of the message it has received includes a syntax of a monetary indicator preceding one or more alphanumeric characters. In response, the messaging application system forwards the text message to the payment service system for processing. The payment service system identifies a recipient associated with the input (or payment proxy) that is derived from the TO field, and further identifies a recipient financial account associated with that recipient. Upon identification of the recipient financial account, the payment service system initiates the transfer of money.

It is noted that the payment proxy technology is equally applicable in other embodiments to various other content providers and various other types of providers, such as financial service providers or to any application that involves communication of messages between users, and that the payment proxy technology is not limited to media channels and/or messaging applications.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the Figures, FIG. 1 is a network environment 100 illustrating interaction between a point-of-sale (POS) terminal 104 and a payment object reader 110, which can receive a biometric characteristic, for example a fingerprint, as a method of payment, according to an embodiment of the present subject matter.

In an example scenario, a customer 102 approaches the POS terminal 104 being manned by a merchant 103, to pay for a product or service in a dedicated checkout area within a merchant store. The POS terminal can be an electronic cash register that is connected to the payment object reader 110 capable of accepting a variety of payment instruments, such as credit cards, debit card, gift cards, near-field communication (NFC) based payment instruments, and the like. The POS terminal 104 can be connected to a central processing server, hereinafter referred to as the payment processing system 114, to obtain inventory of available products and services. The POS terminal 104 can work in both online and offline modes to allow the merchant 103 to both access to the inventory and process payments in both offline and online modes.

The merchant 103 (in case of a manned store) or the customer 102 (e.g., in a self-checkout aisle) selects at least one product from the inventory displayed on a display 108 and moves on to a "check-out" page to finalize the purchase transaction. At this stage, the customer 102 may provide a payment object (e.g., debit, credit, prepaid, checks, etc.), cash (or its equivalent), securities, virtual currency, rewards, points, miles, etc., and/or other payment options, into a payment object reader 110 to pay for the items purchased.

The payment object reader 110 may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain data off any payment object. Accordingly, the payment object reader 110 may include hardware implementation, such as slots, magnetic tracks, and rails with one or more sensors or electrical contacts to facilitate detection and acceptance of a payment object.

Alternatively, the customer 102 can provide a biometric payment instrument to pay for the items purchased. The biometric payment instrument can be initialized using any kind of biometric characteristic, e.g., fingerprints, voice print, speech patters, facial geometry, facial image, genetic signature, or retinal iris scan. For this, in one implementation, the payment object reader 110 includes or is connected to a biometric sensor 120 to receive and process biometric characteristics and process them as payment instruments, given that such biometric characteristics are registered with the payment processing system 114 and connected to a financial account.

Going back to the method of payment, the customer can choose to pay for the transaction through a payment object instead of a biometric payment instrument. For this, the merchant 103 or the customer 102 swipes the customer's payment object through the payment object reader 110. The payment object reader 110 extracts relevant payment transaction data, i.e., information required for processing payment transactions, including, but not limited to, debit account information, credit cardholders name, credit card number, expiration date and card verification value (CVV), digital permanent account number (PAN), etc. The term "swipe" here refers to any manner of triggering the payment object reader 110 to read data from a payment object, such as by dipping into, tapping, bringing in close contact or passing a card into or through the payment object reader 110, such as a magnetic stripe card reader, optical scanner, smartcard (card with an embedded IC chip) reader (e.g., an EMV-compliant card reader or NFC enabled reader), radio frequency identification (RFID) reader, Bluetooth-enabled reader, or the like.

As addressed in the present disclosure, in one scenario, the customer 102 may wish to maintain anonymity to prevent personal information of the customer 102 from being collected by the merchant 103, for example through use of a payment object. As another example, the customer 102 may be wary of the customer's card data being misused to conduct fraudulent transactions. In another scenario, the customer 102 may not be carrying a physical means of payment to furnish payment at the merchant's location. In all such scenarios, the customer 102 can utilize biometric characteristics, such as a fingerprint image, to replace a traditional payment object and unlock access to an electronic wallet containing the customer's different payment preferences, payment modalities or a single account with financial information therein. The biometric characteristic can be linked to credit and debit card accounts and also checking and savings account, thus reducing the back-end processing fee for the merchant.

Thus, in one implementation, instead of the complete card information, cash or account information, the customer 102 pays for the product by scanning on the biometric sensor 120 at least one biometric characteristic including but not limited to: fingerprints, hand characteristics, eye characteristics, characteristics of the customer's face or his/her facial contours, and voice characteristics such as voice spectrum. The biometric sensor 120 may include one or more of a fingerprint sensor, a retinal scanner, a voice recorder and/or any other device for accepting biometric information from a customer 102.

To use a biometric characteristic as a payment instrument, the customer 102 first registers the desired biometric characteristics as potential payment instruments with a central payment processing system 114, or locally within, for example, a secure enclave system in the mobile device. For example, the customer 102 launches or opens a mobile payment portal 122 (e.g., a payment application installed on the device or a web application in web browser) executing on a mobile device 106, e.g., a phone or a laptop, or the POS terminal 104 to initiate registration of the biometric characteristics, such as customer's fingerprints, voice, etc. The mobile payment portal 122 facilitates collection of and connection between the customer's biometric characteristics with the financial account information of the customer. For example, the mobile payment portal 122 requests the customer 102 to provide the biometric characteristics through another sensor (e.g., one similar to sensor 130) associated with the mobile device 106, followed by the financial account information. The mobile payment portal 122 then saves such relationships in a database 116 associated with the payment processing system 114. Additionally or alternatively, the mobile device 106 or the payment processing system 114 creates and saves digital signatures based on the characteristics. In another implementation, the biometric sensor receives the biometric characteristics but sends the biometric characteristic to a biometric processor which then creates the signatures and/or applies a cryptographic algorithm, for example encryption or tokenization, to the received biometric characteristics.

Once saved in the database 116, the registered biometric characteristics can be retrieved and used as valid payment instruments to pay for any payment transaction. Furthermore, the characteristics may correspond to several financial accounts. For example, the fingerprint may correspond to a credit account of the customer while the iris scan may correspond to a debit account. In some scenarios, the database 116 may be connected to the financial institutions using current art systems.

The customer 102 has the option to register the biometric characteristics as payment instruments using either his personal mobile device or the POS terminal at the time of transaction, or his personal mobile device at his leisure. The biometric characteristics and/or its encoded information can be stored locally within the payment object reader 110, the mobile device 106 and/or sent to a payment processing system 114 through a communication network 111. After the customer 102 registers the desired biometric characteristics with the payment processing system as payment instrument, the biometric characteristics of the customer 102 can be accessed from the stored location and used at the time of transaction, for example through the point of sale terminal.

Now, the process of payment using a registered biometric characteristic as a biometric payment instrument is described. At the time of transaction, when the customer 102, on arrival at the point of payment, wishes to use his biometric characteristic as a biometric instrument to purchase a product, the customer 102 scans his/her fingerprints from, for example, an index finger 118 (or hand) of the customer 102 at a biometric sensor 120, e.g., a fingerprint reader, associated with the payment object reader 110. Alternatively, the biometric sensor 120 can scan the characteristics of the hand. The biometric sensor 120 can also scan the characteristics of one or both of the customer's eyes, for example if the iris or retina is used as a biometric instrument. If it is the customer's voice that is to be used as biometric instrument, such as the voice frequency spectrum, the biometric sensor 120 captures the voice or sound that issues from the customer. In another case, it may instead be desirable that the customer's face should form said characteristic, which the biometric sensor 120 recognizes, for example, using the consumer's facial contours or details of his/her face. Since the biometric characteristics of a person are, as a general rule, unique to that person, the danger of fraud is almost entirely eliminated. The description hereinafter uses fingerprint as an example, however the methods and systems can be implemented using any or a combination of biometric characteristics.

In some implementations, the biometric sensor 120 in the payment object reader captures this characteristic, for example, the fingerprint as a whole, while in other implementations, the biometric sensor 120 captures a digital signature of the fingerprint at the merchant location. The biometric sensor 120 implements a tokenization technique, similar to the one used at the time of fingerprint registration, to generate another digital signature or representation of the imprint in response to the captured fingerprint at the merchant's location.

In one implementation, the POS terminal 104 sends the generated digital signature to the payment processing system 114 for comparison with a stored biometric instruments or registered digital signatures, and subsequently verifies customer identity based on the comparison. The payment processing system 114 compares the biometric characteristic or characteristics registered by respectively the customer 102 and the digital signature obtained at the payment object reader 110.

If the digital signature matches with a pre-registered and stored biometric instrument in database 116 associated with the payment processing system 114, the merchant 106 through the POS terminal 104 authorizes customer's fingerprint as a legitimate means to make payment. If the digital signature does not match, the POS terminal 104 generates a notification for the customer 102 to try another means of payment.

In some implementations, in addition to fingerprint, some payment card transactions may require the merchant 106 or the customer 102 to manually enter additional identifiers, e.g., phone number, email address, a previously assigned password, a random number that varies for each transaction, a personal identification number, and/or a verification number of the payment card, as an additional step of verification. To this end, the computing devices, for example POS terminal 104, may include one or more mobile payment applications or application program interfaces (APIs) having a graphical user interface component to allow a merchant 106 or customer 102 to enter the customer identifier.

On receiving authorization or contemporaneous to the authorization step, the POS terminal 104 or the payment processing system 114 on behalf of the merchant, generates a fund transfer request for the amount of product or service requested by the merchant 103 and sends to a computer system 114 of a payment processing service (hereinafter "payment processing system" or "PPS 114") via a communications network 111. The payment processing system 114 can be a cloud computing environment, a virtualized computing environment, a computer cluster, or any combination thereof. The PPS 114 can analyze the fund transfer request based on a plurality of rules stored in a knowledge database (not shown) before sending the fund transfer request to a computer system 112 of the PPS' acquirer or merchant's acquirer (hereinafter "acquirer 112"). For example, one of the rules in the knowledge base may be determining whether the request is in a certain format or whether the request when run against a risk machine yields a safe score, or that the request was authorized based on fingerprint. In one implementation, the acquirer 112 is a bank or financial institution that processes payments (e.g., credit or debit card payments) and may assume risk on behalf of a merchant 103 or a plurality of merchants 106 aggregated by and represented under PPS 114. The acquirer 112 sends the fund transfer request to the computer system 124 of a card payment network (e.g., Visa®, MasterCard®, Discover® or American Express®) (hereinafter "card payment network 124") to determine whether the transaction is authorized or deficient in any other way. In some implementations, PPS 114 may serve as an acquirer and connect directly with the card payment network 124. The card payment network 124 forwards the data to the computer system of the issuer 126 (e.g., issuing bank). The issuer 126 is a bank or financial institution that offered a financial account (e.g., credit or debit card account) to the customer 102. The issuer makes a determination as to whether the customer's payment information is valid and whether the customer 102 has the capacity to absorb the relevant charge associated with the payment transaction.

Each of the aforementioned computer systems can include one or more distinct physical computers and/or other processing devices which, in the case of multiple devices, can be connected to each other through one or more wired and/or wireless networks. All of the aforementioned devices are coupled to each other through the communications network 111, including the Internet, intranet, a cellular network, a local area network, a wide area network, or any other such network, or combination thereof. Protocols and components for communicating over such a network are well known and is not discussed herein. Furthermore, PPS 114, the POS terminal 104, and the mobile device 106 can also communicate over the communications network 112 using wired or wireless connections, and combinations thereof. If the payment transaction is approved by the issuer 126 and/or the card payment network 124, a payment authorization message is communicated from the issuer to the merchant POS device 104 via a path opposite of that described above.

Responsive to the approval, PPS 114 may be programmed to collect, collate, and store the payment transaction data. Besides the computing devices 106 and 104, PPS 114 can collect the payment transaction data from various other entities, such as the acquirer 112, the card payment network 124, and the issuer 126. Therefore, the payment transaction data can include, e.g., an amount of the payment transaction, the method of payment, an identification of the associated financial account, an identity of the merchant, and item-level information. The item-level information relates to the goods or services involved in the payment transaction. The item-level information can include names, identification numbers, prices, tax, discounts and other price adjustments, and/or descriptions of the goods or services. For example, item-level information of a purchase in a coffeehouse can include information such as tea latte and blueberry muffin (i.e., names), SKU 102 and SKU 231 (i.e., stock-keeping unit numbers), $2.99 and $3.49 (i.e., prices).

Using an interactive payment service, the PPS 114 can display the collated payment transaction data to the customer 102 in a variety of ways. For example, the PPS 114 can generate an interactive digital receipt based on the payment transaction data and send the interactive digital receipt to the computing devices 106 and 104 in the form of a cell phone message, an electronic mail message, a webpage, a push notification, or a user interface within the mobile payment portal 122 as proof of purchase for the customer 102. In one implementation, the customer 102 can interact with the interactive digital receipt for performing various tasks, such as confirming the total amount, adjusting tip amount, entering feedback, applying promotional discount, etc.

In another embodiment, the customer 102 can make proximity payments by implementing the aforementioned biometric payment technology. In one scenario, the customer 102 makes a purchase and approaches the point of sale terminal to pay for the purchased item via fingerprint. Through location based detection techniques, for example by establishing geo-fences, the point-of-sale terminal identifies either the customer or a mobile device associated with the customer 102. The assumption here is that the customer 102 is carrying the mobile device 106 on him as he walks around in the merchant's store. The merchant 103 through the POS terminal 104 pushes the bill onto the mobile device 106 of the customer 102 to validate payment, using communication network 111 such as Wi-Fi or Bluetooth enabled networks. In one implementation, the customer 102 authorizes the payment by scanning the registered biometric characteristics onto a biometric reader connected to the mobile device.

The mobile device sends the digital signature of the fingerprint to the payment processing system 114 for comparison with a previously registered fingerprint to confirm whether the attempting person is an authorized user. The payment processing system 114 compares the signatures and if a successful match is obtained, processes the transaction.

In yet another embodiment, the customer 102 can make another type of proximity payment by implementing the aforementioned biometric payment technology. In this scenario, the customer 102 approaches the point of sale terminal to make a purchase and pay for the purchased item via fingerprint or other biometric. After the customer 102 scans his fingerprint at POS terminal 104, the merchant 103 through the POS terminal 104 pushes the bill or invoice onto the mobile device 106 of the customer 102 to validate payment, using communication network 111 such as Wi-Fi or Bluetooth enabled networks. In particular, POS terminal 104 can send the digital signature of the fingerprint to the payment processing system 114, which forwards the digital signature to the mobile device 106 for comparison with a previously registered fingerprint to confirm whether the attempting person is an authorized user. Optionally, the payment processing system 114 can confirm that mobile device 106 is within a threshold distance of POS terminal 104, or mobile device 106 can confirm that mobile device 106 is within a threshold distance of POS terminal 104, before proceeding. The mobile device 106 compares the signatures and if a successful match is obtained, sends confirmation to the payment processing system 114 which processes the transaction. In other words, the mobile device 106 can compare the acquired biometric measurements with stored values on the mobile device (e.g., stored by customer 102 before attempting a purchase with merchant 103) thereby self-validating use according to the results of the internal comparison. Based on positive results of this comparison, the fingerprint may be validated for use by the person attempting to make the transaction at POS terminal 104. Conversely for negative results, use of the means of payment may be invalidated or disabled.

FIG. 2 is a block diagram 200 illustrating registration of biometric characteristics, for example a customer's fingerprint, as a method of payment using a mobile device 206, according to an embodiment of the present subject matter.

In one implementation, the mobile device 206 includes a computer readable media 208 having one or more components configured specifically to allow the customer to process biometric characteristics as payment tools, a processor 230, a display 232, a database 210, a network interface 234, a transmitter 236, and an antenna 238. As shown, the mobile device 206 includes a computer-readable media 208 that may store a payment component 212, a signature component 214, the registration application 216, and the location component 218. The payment component 212 can be configured to detect and send payment information associated with a registered biometric instrument. The signature component 214 and the registration component 216 can be configured to generate the signature in response to a received biometric characteristic 250-1, . . . 250-N (collectively 250), and register the fingerprint with a payment processor, such as payment processing system 242. In one implementation, the biometric scanner 240 and the signature component 214 include electronic circuits that are self or internally powered, for example, by provision of a dry-cell battery. Such devices or components, unlike conventional passive RFID-tag like electronic circuits, do not have to receive external RF power signals for circuit activation or functions. Additionally or alternatively, the components are driven by a secure enclave processor separate from the processor of the mobile device. User identification processes can be accomplished locally in isolation at the payment device level without interaction or communication with external devices (e.g., RFID tag readers and POS devices or other wireless network access points). This isolation reduces the risk of electronic pick pocketing of account information that can occur when payment devices are continually in wireless communication with external devices.

The mobile device 206 also includes the biometric scanner 240 to allow the customer 202 to register desired biometric characteristics as payment instruments. In some implementations, the biometric scanner 240 can be external to the mobile device and connected to the mobile device 206 as a dongle. The customer 202 using the biometric scanner 240 on the mobile device 206 scans the registered biometric characteristics, e.g., fingerprint of the index fingers or all fingers. The biometric scanner 240 captures an image of the fingerprint. In some other implementations, the biometric scanner 240 captures the image of the fingerprint 220 and converts it into a digital signature 224 of the fingerprint. The signature is a unique value or token 226 corresponding to the fingerprint and not necessarily, the actual fingerprint itself. To compute the unique digital signature 224, the biometric scanner 240 through a signature component 214 implements a tokenization technique to generate a signature or representation of the imprint in response to the captured fingerprint.

Briefly described, the biometric scanner 240, when scanning a fingerprint, determines sets of minutia and ridge points, such as ridge endings, directional information, and bifurcations of the ridge patterns extracted from the input fingerprint, hereinafter referred to as minutiae set 222. In some implementations, the minutiae set 222 may include additional information, such as distance between two minutiae sets. For example, the minutiae sets 222 extracted from a fingerprint can be represented by a fixed length vector code. The matching of the fingerprint is then based on the matching of the vector codes, discussed later.

At this time, the biometric scanner 240 can locally and/or on the payment processing system 242 store the minutiae sets obtained from the input fingerprint. Alternatively, in some implementations, the biometric scanner 240 sends the minutiae sets to a signature component 214 being executed by a processor of the mobile device 206 to generate the digital or encrypted signature 224.

To generate a digital signature 224 of the received fingerprint or minutiae sets representing the fingerprints, the signature component 214 obtains the minutiae set(s) and extracts features, e.g., in the form of discrete cosine transform (DCT) coefficients, and creates feature vectors. The signature component 214 can also apply tokenized pseudorandom numbers (also referred to as hash keys) to the feature vectors to generate the digital signature. A National Institute of Standard and Technology (NIST) compliant True Random Number Generator (TRNG) can generate the pseudorandom numbers. Again, the mobile device 206 stores the digital signature either locally within the device 206 or in the payment processing system 242.

The signature component 214 can encrypt the minutiae sets based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key).

The signature component 214 can also create the digital signature or an encrypted fingerprint using other schemes, such as fuzzy vault algorithm, a cancelable fuzzy vault scheme based on irreversible hash functions, fingerprint minutiae algorithms based on a thinned fingerprint image as opposed to an original fingerprint image using hash functions, such as hash functions, such as MD, RIPEMD, and SHA.

After the customer 202 scans the biometric characteristic and the biometric scanner 240 generates the digital signature 224, the customer 202 accesses a registration application 216 executing on a computing device 206 associated with the customer 202. The term "registration application" or "mobile payment portal" as used here, refers to any registration application that enables communication between users (e.g., sender and recipient of a message) over a wired or wireless communications network. The registration application 216 can be employed by a service provider that delivers a communication service to users, e.g., chat capability or capability to enter payment information, say through a form. The registration application 216 may include one or more modules and/or engines, or a module and/or engine can include one or more applications. The registration application 216 can include, for example, a mobile payment application, a text messaging application for communication between phones (e.g., conventional mobile telephones or smartphones), or a cross-platform instant messaging application for smartphones and phones that use the Internet for communication.

The registration application 216 can also include, for example, a web browser application installed on a mobile device 206 of the customer 202 accessible via a uniform resource locator (URL). In some embodiments, the URL is identified by a graphical user interface (GUI) of a mobile payment application installed on the mobile device 206. It is noted that the biometric payment technology is equally applicable in other embodiments to various other content providers and various other types of providers, such as financial service providers or to any application that involves registration of information, and that the biometric payment technology is not limited to payment channels and/or messaging applications.

Through the registration application 216, the customer 202 submits financial account information, for example through specific fields in a form. The customer 202 can also take an image of the credit card or debit card from which the registration application 216 can intelligently extract financial information. Alternatively, the registration application 216 can be a banking application and can automatically connect to one or more bank computing device(s) 112; and a card payment network computing device(s) 126; issuer 126; all of which are connected via a communications network(s) 204.

On receiving the financial bank details, the registration application 216 presents the customer 202 with the option to link the computed digital signature 224 of the customer's fingerprint with the financial account associated with the customer 202. For example, the mobile device 202 presents the customer 202 with the options on a graphical user interface of the mobile device 202. Based on a confirmation to the link from the customer 202, the registration application 216 connects the fingerprint and the financial account with each other. The signature component 214 (operating on rules defined by the registration application 216) tokenizes the information and sends the tokenized information as a new biometric instrument 246 to be stored locally within the mobile device 202, e.g., in other data 228, or in the payment processing system 242. The payment processing system 242 includes a comparator 244 to allow comparison between digital signature stored at the time of registration and those received at the time of payment. In one embodiment, the mobile device 206 includes location component 218, which detects whether the customer is at a merchant location and accordingly, alerts the customer 202 to use the registered biometric instrument at a merchant location or reminds the customer to register a biometric characteristic (if not already) as a payment instrument when the mobile device 206 is at a predetermined distance away from a point of sale terminal. In some implementations, the mobile device 206 includes the comparator 244, biometric instruments 246, and digital signatures 248. Thus, all comparison may be made locally within the mobile device 206 instead of the payment processing system 242, as described above.

FIG. 3 illustrates a data flow method 300 using example user interfaces, being presented on the mobile device (POS terminal 104 or the customer device 106), for registering a customer's biometric characteristic as payment instrument with the PPS 114, applicable in both online and in-store purchases, and applicable both in embodiments in which the registered biometric characteristic stays resident solely on the mobile device and also in embodiments in which the registered biometric characteristic is transmitted from the mobile device (e.g., to PPS 114, etc.), according to embodiments of the present subject matter. For ease in understanding, assume that the customer wishes to register his fingerprint as a biometric payment instrument. Even though user interfaces A-E, in one example scenario, are in sequence; other sequences are also possible.

The user interfaces A-E may allow for the display, execution, interaction, manipulation, and/or operation of program components and/or system facilities through textual and/or graphical facilities through one or more interaction interface elements, such as check boxes, cursors, menus, scrollers, and windows (collectively and commonly referred to as widgets) to facilitate the access, capabilities, operation, and display of data and computer hardware and operating system resources, and status. The user interfaces may be used to provide a baseline and means of accessing and displaying information graphically to users. The user interface may also be a graphic user interface as provided by, with, and/or atop operating systems and/or operating environments such as discussed herein.

In various embodiments, the user interface is relayed on an audio or video display with a touch screen and driver, the touch screen being based upon a variety of later-developed or current touch screen technology including resistive displays, capacitive displays, optical sensor displays, electromagnetic resonance, or the like. Additionally, touch screen display may include single touch or multiple-touch sensing capability. Any display technology may be used for the output display, such as a Liquid Crystal Display (LCD) or solid state device such as light-emitting diode (LED) or organic light-emitting diode (OLED), a thin film transistor (TFT) display, Plasma display, trans-reflective (Pixel Qi) display, electronic ink display (e.g. electrophoretic, electrowetting, interferometric modulating).

In various embodiments, the resolution of such displays and the resolution of such touch sensors may be set based upon engineering or non-engineering factors (e.g. sales, marketing). In some embodiments, speakers and LED indicators can be used to present audio and visual identifiers of transaction and device status.

The user interface A of the customer device 304 requests the customer to scan the biometric characteristics of his choice. For example, the customer opens the registration application 306 on the mobile device 304 scan the fingerprint of the index finger onto the scanner 308. The scanner may be under the logo shown on the display. Alternatively, the scanner can be a separate button used for other purposes such as turning the phone off or on. Even though index finger has been used as an example, any other biometric characteristic may be used.

The user interface B of the mobile device 304 presents the user with an option to re-scan the fingerprint. The mobile device 304 matches the two fingerprints received and generates a digital signature using tokenization techniques. The mobile device processes the received fingerprint, e.g., the distance between ridges to obtain a minutiae set and generates a unique code. The mobile device 304 displays a message to indicate this on the screen in the user interface C. Once confirmed, another interface may request the customer 106 to enter a password associated with the POS terminal 104.

The user interface D of the mobile device 304 presents the user with a form to allow registration of the fingerprint as a payment instrument. For this, the customer can provide credit/debit card information or log into a banking account to authorize payments via the fingerprint. If the user selects the banking account, a payment application associated with the financial institution may open as a web application or a mobile application installed on the mobile device 304. The user can also set conditions or limits to the use of fingerprint as a payment instrument. For example, another user such as the account holder can specifies one or more conditions (restrictions) to be applied to the beneficiaries or the customer's use of the funds. The conditions can include, for example, conditions upon the time and/or manner of use of the funds. Conditions on the time of use of the funds can include, for example, limiting to or exclusion of specific dates or date ranges, specific days of the week, specific time ranges within a day (e.g., "11:00 AM to 2:00 PM" or "lunchtime"), etc., or any combination thereof. Conditions on the manner of use of the funds can include, for example, limiting to or exclusion of specific merchants or types/categories of merchants (e.g., restaurants); limiting to or exclusion of particular goods or services; setting a maximum amount per transaction, or per merchant, or per merchant per transaction (which could apply to a specific merchant or to all merchants); limiting to or exclusion of a particular location or locations where the funds can be used, etc., or any combination thereof. Further, the funder can be allowed to specify exceptions to some or all of the conditions. Hence, the conditions can be in the form of a whitelist (allowable items), or a blacklist (non-allowable items), or a combination thereof. At least some of the conditions may be hyperlinked to take the funder to additional pages/screens, to allow the funder define more-specific conditions. Thus, a parent can set a card-less payment option using biometric instrument for their children by registering their fingerprints to the system. The parents can also set limits to the amount the child can use for purchases.

After the customer enters relevant bank information, in one embodiment the package (i.e., the digital signature, conditions, and the banking information) is sent to the payment processing system, which creates a payment instrument corresponding to the fingerprint, and saves the established association between the fingerprint and the customer's financial account into a database. In another embodiment the package (i.e., the digital signature, conditions, and the banking information) is registered with the payment processing system but retained solely on the mobile device, which creates a payment instrument corresponding to the fingerprint and saves the established association between the fingerprint and the customer's financial account into a local database of the mobile device (e.g., within a secure enclave, etc.).

The user interface E of the mobile device 304 presents the user a message confirming successful registration of the fingerprint as a biometric payment instrument. Depending on the implementation, the message can optionally include a form requesting the customer to set a unique code or password to be matched at the time of payment. The customer can also enter another method of payment (e.g., iris scan or voice) with the same or different payment card or end the process using the "Register" and "Finish" options, respectively.

FIG. 4A is a flowchart illustrating an example process 400 of processing a payment corresponding to a biometric payment instrument, according to an embodiment of the present subject matter. The process 400 can be performed by one or more components, devices, or modules such as, but not limited to, the mobile device, the payment processing system, merchant device or POS terminal, or payment beacon or other components or devices. As illustrated in FIG. 4, the process 400 includes a set of operations from block 402 to block 422.

The process 400 starts with the operation at block 402. A customer scans a biometric characteristic, e.g., a fingerprint, on a biometric sensor 120 associated with a payment object reader (step 402). The biometric sensor 120 processes the received fingerprint, e.g., the distance between ridges to obtain a minutiae set. As the biometric characteristics are scanned in the biometric sensor 120, the sensor (or an associated payment object reader) creates a buyer digital signature corresponding to the minutiae set obtained off the fingerprint. The buyer digital signature may also include data pertaining to the transaction, for example, the location and time of the transaction (step 404). The POS terminal receives the digital signature (step 406). In one implementation, the POS terminal further encrypts the received digital signature and transmits the encrypted signature via a communication network, e.g., the USB/Wi-Fi connection (step 408), to a central server, such as the payment processing system 114. In one embodiment, the PPS 114 then compares the syntax and content of the buyer digital signature with registered biometric instruments to determine whether or not buyer digital signature corresponds to a registered biometric payment instrument (step 410). In another embodiment, the PPS 114 then transmits the buyer digital signature to one or more customer mobile devices, such as those determined to be proximate to the POS terminal based on geo-fence data, to determine whether or not the buyer digital signature corresponds to a registered biometric payment instrument.

If the match operation (step 412) as a result of the comparison at step 410 yields a "Yes," the flow transitions to step 416. First, the PPS 114 identifies the buyer as a registered user (e.g., after performing the comparison itself, or after receiving a confirmation from a customer mobile device proximate to the POS terminal after the customer mobile device performs the comparison, etc.). Then, the PPS 114 deconstructs or analyzes the payment instrument matching with the buyer digital signature to determine identifier information of the customer 102, and optionally, the merchant 103. The PPS 114 also identifies a financial account connected to the buyer based on the identifier information of the user 107 (step 416).

At step 418, the PPS 114 also checks whether the registered biometric payment instrument corresponding to the buyer digital signature is associated with any rules or if there are enough funds in the financial account connected to the payment instrument. For example, the rules may allow the customer to use the credit card unconditionally, but the fingerprint connected to the credit card may be authorized for a payment of a certain amount only, or unauthorized for certain purchases. Thus, the restrictions can define the time and/or manner in which the buyer can use the funds through fingerprint. Conditions on the time of use of the funds can include, for example, limiting to or exclusion of specific dates or date ranges, specific days of the week, specific time ranges within a day (e.g., "11:00 AM to 2:00 PM" or "lunchtime"), etc., or any combination thereof. Conditions on the manner of use of the funds can include, for example, limiting to or exclusion of specific merchants or types/categories of merchants (e.g., restaurants); limiting to or exclusion of particular goods or services; setting a maximum amount per transaction, or per merchant, or per merchant per transaction (which could apply to a specific merchant or to all merchants); limiting to or exclusion of a particular location or locations where the funds can be used, etc., or any combination thereof. Further, the funder can be allowed to specify exceptions to some or all of the conditions. Hence, the conditions can be in the form of a whitelist (allowable items), or a blacklist (non-allowable items), or a combination thereof. At least some of the conditions may be hyperlinked to take the funder to additional pages/screens, to allow the funder define more-specific conditions.

For example, by using the PPS 114, a parent (the funder or account holder) of a school-age child (the beneficiary and also the customer whose fingerprint is registered) can allocate $40 from the parent's bank account per week, for use by the child only for the purpose of buying lunch during school days. The funder specifies to the PPS 114 which funds are to be provided, the identity of the beneficiary and the conditions to be imposed on the beneficiary's use of the funds; these items of information collectively form at least part of an "allowance plan" that is stored by the PPS 114 in a database and used by the PPS 114 to regulate the beneficiary's subsequent use of the funds. The PPS 114 has access to an account of the funder that contains those funds and can draw upon those funds as needed.

The beneficiary can then make use of the funds by using one of various predetermined payment mechanisms (discussed further below) to initiate a transaction with a third party, such as a merchant. When the beneficiary initiates a transaction, the PPS 114 receives and evaluates information about the requested transaction against the conditions specified (by the funder) in the allowance plan. Based on that evaluation, the PPS 114 determines whether to authorize payment for the transaction from the specified funds of the funder. In some embodiments, the PPS 114 may receive or determine information that allows it to make a preliminary authorization decision even before a transaction has been initiated.

In response to identification of the customer's financial account and based at least on one or more conditions (restrictions), the PPS 114 through the acquirer 112 and issuer 114 computing systems, causes the funds to be transferred from the user's financial account to the merchant's financial account (step 422).

If, however, the authorization cannot be made, say due to insufficient funds or a restriction, the POS terminal 104 notifies the customer that he/she is not a registered and to retry with another object (step 420). The POS terminal 104 may further generate real-time instructions to facilitate the merchant to allow registration at this time. For example, the POS terminal 104 presents real-time and customized instructions, such as, "press a button located at the bottom of the reader," "turn the device off for five seconds" "register your bank account at this time," "move the device an inch closer to the terminal," "do you need additional assistance?" "connecting to a support representative," "your bank has approved registration," and so on. To this end, the merchant 109 submits user engagement input in response to each of the configuration instructions while the POS terminal waits. Other examples of user engagement input include providing authentication or security keys as a visual, audio or haptic input.

FIG. 4B is a flowchart illustrating an example process 450 of processing a payment corresponding to a biometric payment instrument, according to another embodiment of the present subject matter. Similar to process 400, the process 450 can be performed by one or more components, devices, or modules such as, but not limited to, the mobile device, the payment processing system, merchant device or POS terminal, or payment beacon or other components or devices. As illustrated in FIG. 4B, the process 450 includes a set of operations from block 452 to block 472.

The process 450 starts with the operation at block 452. A customer scans a biometric characteristic, e.g., a fingerprint, on a biometric sensor 120 associated with a payment object reader (step 452). The biometric sensor 120 processes the received fingerprint, e.g., the distance between ridges to obtain a minutiae set. As the biometric characteristics are scanned in the biometric sensor 120, the sensor (or an associated payment object reader) creates a buyer digital signature corresponding to the minutiae set obtained off the fingerprint. The buyer digital signature may also include data pertaining to the transaction, for example, the location and time of the transaction (step 454). The POS terminal 104 receives the digital signature (step 456). In one implementation, the POS terminal 104 further encrypts the received digital signature, such as step 458.

At step 460, the POS terminal 104 detects a relevant mobile device, such as the mobile device 106, belonging to the customer who making the purchase and/or is using the fingerprint as a payment instrument. In one implementation, the POS terminal 104 detects the mobile device 106 based on identifiers provided by the customer, such as phone number or model number of the mobile device. In another implementation, the POS terminal 104 detects the mobile device 106 as the mobile device 106 enters the "geo-fence" of the POS terminal, with or without user intervention.

A geo-fence can be defined by reference to a perimeter, or boundary, surrounding a geographic area of the POS terminal or the mobile device or the biometric reader, and detected by a sensor associated with any of these devices. The geographic area can be substantially circular or can be a polygon or any other shape. The POS terminal 104 can implement a Global Positioning System (GPS), Bluetooth Technology, Near-Field Communication Technology, sensors-based technology, Radio frequency identification (RFID) system, or the like, to detect its own location and location of neighboring objects. In one embodiment, the present subject matter enables automatic geo-fence establishment and activation. According to the present subject matter, the geo-fence is defined and established based on a current location of an asset, for example using GPS data comprising latitude and longitude along with some predetermined area based on range or distance. In this manner, the user need not manually specify a location by drawing a perimeter, specifying a point location, or by any other means.

When another object exits or enters the geo-fence, the sensor detecting such presence, sends an alert or notification to the POS terminal 104 indicating details of the object, such as object name (emitted by the device itself) or another identifier, such as a name or payment proxy (based on a prior registration with the POS terminal) associated with the object.

At step 462, the POS terminal transmits the encrypted signature via a communication network, e.g., the USB/Wi-Fi connection (step 458), to a central server, such as the payment processing system 114 or the detected mobile device 106 in step 460.

In one embodiment, the PPS 114 then transmits the buyer digital signature to one or more customer mobile devices, such as those determined to be proximate to the POS terminal based on geo-fence data, to determine whether or not the buyer digital signature corresponds to a registered biometric payment instrument. The mobile device 106 has stored thereon customer's fingerprints as digital signature and the financial information as well. The mobile device 106 compares the syntax and content of the buyer digital signature with registered biometric instruments to determine whether or not buyer digital signature corresponds to a registered biometric payment instrument (step 464).

If the match operation (step 466) as a result of the comparison at step 464 yields a "Yes," the flow transitions to step 468, where the mobile device 106 or the PPS 114 identifies the buyer as a registered user (e.g., after performing the comparison itself, or after receiving a confirmation from a customer mobile device proximate to the POS terminal after the customer mobile device performs the comparison, etc.). Then, the mobile device 106 or the PPS 114 deconstructs or analyzes the payment instrument matching with the buyer digital signature to determine identifier information of the customer 102, and optionally, the merchant 103. The mobile device 106 or the PPS 114 also identifies a financial account connected to the buyer based on the identifier information of the user 107 (step 470).

At step 472, in response to identification of the customer's financial account and based at least on one or more conditions (restrictions), the PPS 114 through the acquirer 112 and issuer 114 computing systems, causes the funds to be transferred from the user's financial account to the merchant's financial account. In various examples, the POS terminal can remove the data corresponding to the biometric characteristic from the POS terminal after the payment transaction is fulfilled (e.g., funds are transferred from the user's financial account to the merchant's financial account).

FIG. 5 is a block diagram that illustrates an example purchase flow 500 in an embodiment of the biometric payment system. The purchase flow 500 begins on the user interface 505 of a merchant application 504, which displays multiple payment methods, e.g., 510 and 520. Through option 510, the customer can use a physical payment object, such as a credit card or debit card, to make the payment. However, when the customer selects the "Checkout with Biometric Payment Object" option or button 520, the signature component 509 requests the customer to specify which characteristics the customer would prefer to use. Alternatively, the signature component 509 only triggers the fingerprint scanner 521 in response to a selection of option 520. The customer enters the fingerprint. The merchant application 504 converts the fingerprint into a digital signature by encrypting the fingerprint and sends the digital signature to the payment processing system for confirmation. Once the payment processing system finds a match for the digital signature in the database; it retrieves a financial account connected to the mapped signature. The payment processing system through the merchant application 504 notifies the customer that the fingerprint has been successfully received, using for example user interface 530. If the fingerprint is not recognized, the customer is asked to either re-enter fingerprint or furnish such information as necessary to process the transaction, for example select option 510.

After receiving the customer's fingerprint as a method of payment, the merchant application 504 can request the customer to enter a password 540 tied to the fingerprint for additional security or verification in the user interface 525. The unique code is entered at the time of registration of the fingerprint as a biometric payment instrument. The customer can also enter an amount 535 corresponding to the purchase on the user interface 525, or alternatively, the payment amount can be auto-populated based on order information received from the merchant application.

Once confirmed, the merchant application 504 initiates transfer of the payment amount from a payment account associated with the customer's fingerprint to a financial account associated with the merchant application 504, and generates message 550 of successful transfer on the merchant application 504 in the user interface 545.

Figure 6:
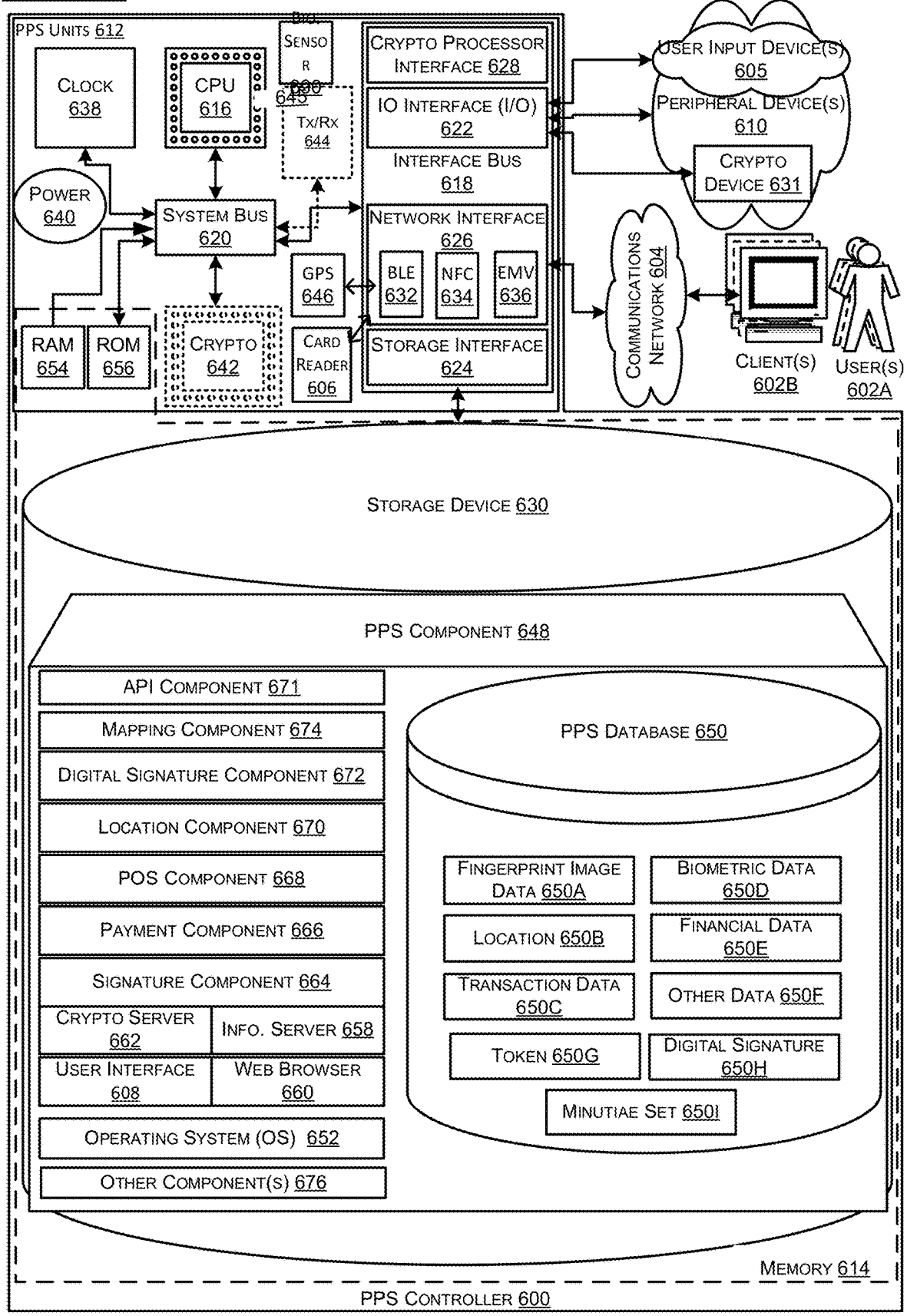
FIG. 6 is a block diagram illustrating components of a payment processing system (PPS) controller, according to an embodiment of the present subject matter.

FIG. 6 is a block diagram illustrating embodiments of a payment processing controller (PPS) controller 600 configured to allow processing of payment transactions between entities, such as a merchant and a customer, or a sender and recipient of funds. In one embodiment, the POS controller 600 may serve to aggregate, process, store, search, serve, identify, instruct, generate, match, and/or facilitate interactions with a computer through various technologies, and/or other related data. The PPS controller 600 may be used to collect data for later retrieval, analysis, and manipulation, which may be facilitated through an internal or external database. For example, the PPS controller 600 on receiving payment related information may complete the transaction, generate receipt as proof of the transaction, update inventory of the product after the transaction, and obtain data related to the customer involved in the transaction, such as transaction history, location data, and the like. The PPS controller 600 can be a customer device (for example, a mobile phone of a customer), a merchant device (for example, a point-of-sale terminal for processing payment transactions), and a payment beacon to send and receive static or dynamic information, for example, the payment proxy, transaction summary or receipt, either perpetually or on activation. The devices may have fewer or more components than defined here as will be clear by context.

Briefly described, the PPS controller 600 integrates the functionalities of the card reader 604 and the biometric reader 606. In some implementations, the card reader 504 and the biometric sensor 606 are external to the PPS controller 600.

In some implementations, the customer 602A can register a biometric characteristic as a biometric instrument at a PPS controller 600 before, contemporaneous to, or after a payment transaction at the merchant's location. Further, in one implementation, the fingerprint (read, entered, and/or captured in any other way from the customer 602A) may be secured using payment token(s). A payment token replaces the real fingerprint data with static or dynamically changing numbers that map to the real fingerprint data. The payment token may be combined with a dynamic cryptogram that prevents the token from being reused. In another implementation, the fingerprint data may be tokenized such that before dispatching to the payment processing system 114, the fingerprint data is replaced with a random set of characters structured in a format similar to the original fingerprint data, but having no relationship to the original fingerprint data. Alternatively or additionally, the payment transaction data can be encrypted using Triple Data Encryption Algorithm (commonly known as Triple DES), Advanced Encryption Standard (AES), or other encryption techniques. In one example, payment transaction data corresponding to a transaction may be packaged into a fund transfer request.

In some implementations, the biometric sensor 120 in the payment object reader captures this characteristic, for example, the fingerprint as a whole, while in other implementations, the biometric sensor 120 captures a digital signature of the fingerprint at the merchant location. The biometric sensor 120 in the POS terminal 104 implements a tokenization technique, similar to the one used at the time of fingerprint registration, to generate another digital signature or representation of the imprint in response to the captured fingerprint at the merchant's location.

In one implementation, the POS controller 600 sends the generated digital signature to the payment processing system 114 for comparison with a stored biometric instruments or registered digital signatures, and subsequently verifies customer identity based on the comparison. The payment processing system 114 compares the biometric characteristic or characteristics registered by respectively the customer 602A and the digital signature obtained at the payment object reader 110.

If the digital signature matches with a pre-registered and stored biometric instrument in database 116 associated with the payment processing system 114, the merchant 106 through the PPS controller 600 authorizes customer's fingerprint as a legitimate means to make payment. If the digital signature does not match, the POS terminal 104 generates a notification for the customer 102 to try another means of payment.

In some implementations, in addition to fingerprint, some payment card transactions may require the merchant 103 or the customer 602A to manually enter additional identifiers, e.g., phone number or email address, as an additional step of verification. To this end, the computing devices, for example PPS controller 600, may include one or more mobile payment applications or application program interfaces (APIs) having a graphical user interface component to allow a merchant 106 or customer 102 to enter the customer identifier.

Users 602A, who may be customers, merchants, consumers, senders or recipients of funds, buyers, sellers, and/or other entities or systems, may engage information technology systems (e.g., computers, mobile devices, laptops, servers) to facilitate processing of information, such as transactional, financial, and so on. It should be noted that the term "server" as used throughout this application refers generally to a computer, other device, program, or combination thereof that processes and responds to the requests of remote users across a communications network. Servers serve their information to requesting "clients" 602B connected to the users 602A. The term "client" or "customer device" as used herein refers generally to a computer, program, other device, user and/or combination thereof that is capable of processing and making requests and obtaining and processing any responses from servers across a communications network 604. Networks 604 facilitate the transfer of information from source points to destinations. The users (e.g., merchants) may directly interact with the POS controller 600, e.g., via the user inputs devices 605.

In one implementation, the PPS controller 600 can be configured to receive a payment card or payment card information to process payment card transactions (i.e., those involving reading of a payment card physically provided by the customer at the merchant's location), as well as card-not-present (CNP) transactions (i.e., those where the instrument is not physically presented at the time that the payment is effected, e.g., through payment proxy), either through a card reader 606 or by providing a graphical user interface 608 to accept financial account information of the user 602A initiating the payment. A payment card transaction may be any transaction where a merchant or a customer uses a payment card to purchase a product or service offered by the merchant, for example, by swiping a user's credit card through a card reader 606 or by providing the information through voice, text, or other wired or wireless data communication techniques. The term "swipe" here refers to any manner of triggering a card reader 606 to read data from a payment card, such as by passing a card into or through a magnetic stripe card reader, optical scanner, smartcard (card with an embedded IC chip) reader (e.g., an EMV-compliant card reader or NFC enabled reader), radio frequency identification (RFID) reader, or the like. Such card readers may either be integrated within the PPS controller 100 (as shown) or connected externally with the PPS controller 600 and/or client(s) 602B as peripheral devices 610. If the card reader 606 is connected externally, the peripheral devices 610 may be connected via wired or wireless communication network 604 and interact to each other through customized interfaces. In one implementation, the card reader 606 can be connected to an audio plug of the PPS controller 600. If the card reader 606 is integrated within the PPS controller 600, the one or more interfaces and components can be configured to accept payment data through various communication protocols. Accordingly, hardware implementation may include creation of slots, magnetic tracks, and rails with one or more sensors to facilitate a user 602A, e.g., a merchant, to detect and accept a payment card. In one implementation, the payment card and the peripheral devices 606 may support the same technology for short-range (typically less than 100 meters) and/or low power wireless communication protocols and technologies, such as Bluetooth Low Energy (BLE), standard Bluetooth, WiFi, Near Field Communication (NFC) or Radio-Frequency Identification (RFID). According to the communication protocol preferred or implemented, the PPS controller 600 may require additional steps to configure the card reader 606 to operate and work alongside the PPS controller 600. For example, a pairing component (described later) may be used to connect, synchronize, and pair the card reader 606 and the PPS controller 600 to facilitate exchange of data obtained off the payment card.

The term "payment card' or 'payment object" refers to a payment mechanism that includes a conventional debit card, a conventional credit card, a prepaid gift card, or the like, a smartcard that has an embedded integrated circuit chip (e.g., Europay-MasterCard-visa (EMV) card), a proxy card, or any card that functions as a combination of any of these mechanisms. The term "proxy card" as used herein refers to a card that may or may not have a card number/account number that appears to be that of a real credit or debit card account (i.e., it is in the correct format), but where that card/account number is actually only a proxy for the customer's real card/account number. The card/account number generally adheres to a naming standard set by the financial institution associated with or issuing the payment card. Other examples of payment card may also include a prepaid card, a gift card, a rewards card, a loyalty points card, a frequent flyer miles card, a check, cash, or any other kind of payment instrument that holds financial value or provides a promise to pay at a later time.

The payment card used in the example above is one type of a financial instrument. Other types of financial instruments, other than the payment card, can be used to initiate the transfer of funds. Another example of a financial instrument is a biometrically identifiable instrument, such as a person's finger (e.g., for fingerprint recognition), face, iris or retina, heartbeat, voice pattern, genetic parameter unique to the user, etc. Alternatively, a financial instrument can be a software instrument or virtual instrument, such as a virtual wallet, optionally embedded in a hardware device to enable contact or contactless payments.

PPS Controller Architecture

In one implementation, the PPS controller 600 may be based on computer systems that may comprise, but are not limited to, PPS units 612 and memory 614. Furthermore, PPS units can comprise hardware and/or software components, referred to as PPS units 612, which may comprise a central processing unit ("CPU(s)" and/or "processor(s) and/or microprocessor(s)" (these terms are used interchangeably)) 616 and an interface bus 618, which may be interconnected and/or communicating through a system bus 620 on one or more motherboard(s) having conductive and/or otherwise communicative pathways through which instructions (e.g., binary encoded signals) may travel to enable communications, operations, storage, etc. The interface bus 618 may also include other interfaces or adapters specific to network, storage, peripherals, and input-output interface(s), through which data may pass into and out of a computer and which allow users to access and operate various system components. The interface bus 618 may be connected to external units, such as peripheral devices 610 or client(s) 602B via communication network 604. Each of the PPS components 612 is now described in detail.

Processor(s)

The CPU 616 may incorporate various specialized processing units, such as, but not limited to: integrated system (bus) controllers, memory management control units, floating point units, and even specialized processing sub-units like graphics processing units, digital signal processing units, and/or the like. In various embodiments, the processor core may be a low-power/ultra-low power/low-cost microcontroller; examples include an Intel Processor like Intel Atom, Apple A4, NVidia Tegra 2, Marvell Armada, Qualcomm Snapdragon, Samsung Hummingbird and Exynos, Tex. Instruments OMAP and MSP microcontroller, ARM Holdings processor like the Cortex-A, -M -R, Series, or ARM series and/or the like processor(s). Should processing requirements dictate a greater amount speed and/or capacity, distributed processors (e.g., Distributed PPS controller 600), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the PPS controller 600 may be achieved by implementing a microcontroller, such as Freescale's Kinetis K21D; and/or the like. Also, to implement certain features of the PPS controller 600, some feature implementations may rely on embedded components, such as: Application-Specific Integrated Circuit ("ASIC"), Digital Signal Processing ("DSP"), Field Programmable Gate Array ("FPGA"), and/or the like embedded technology. Depending on the particular implementation, the embedded components may include software solutions, hardware solutions, and/or some combination of both hardware/software solutions.

Interface Bus and Adapters

Interface bus(ses) 618 may accept, connect, and/or communicate to a number of interface adapters, although not necessarily in the form of adapter cards, such as but not limited to: input-output interfaces (I/O) 622, storage interfaces 624, network interfaces 626, and/or the like. Optionally, cryptographic processor interfaces 628 may be connected to the interface bus 618.

Storage interfaces 624 may accept, communicate, and/or connect to a number of storage devices such as, but not limited to: storage devices 630, removable disc devices, and/or the like. Storage interfaces 630 may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), fiber channel, Small Computer Systems Interface (SCSI), Universal Serial Bus (USB), and/or the like.

Input-Output interfaces (I/O) 622 may accept, communicate, and/or connect to user input devices 605, peripheral devices 610, such as externally connected card readers, cryptographic processor devices 631, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); USB 2.0; USB 3.1; USB Type C; Ethernet; infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, Li-Fi etc.); and/or the like. In various embodiments, an audio or video display with a touch screen and driver may be included, the touch screen being based upon a variety of later-developed or current touch screen technology including resistive displays, capacitive displays, optical sensor displays, electromagnetic resonance, or the like. Additionally, touch screen display may include single touch or multiple-touch sensing capability. Any display technology may be used for the output display, such as a Liquid Crystal Display (LCD) or solid state device such as light-emitting diode (LED) or organic light-emitting diode (OLED), Plasma display, trans-reflective (Pixel Qi) display, electronic ink display (e.g. electrophoretic, electrowetting, interferometric modulating). In various embodiments, the resolution of such displays and the resolution of such touch sensors may be set based upon engineering or non-engineering factors (e.g. sales, marketing). In some embodiments, speakers and LED indicators can be used to present audio and visual identifiers of transaction and device status. In addition, buttons may be configured to power PPS controller 600 on or off, operate the controller or reset the controller 600.

In some embodiments of the PPS controller 600, image capture device may be included, which may further include a sensor, driver, lens and the like. The sensor may be based upon any later-developed or convention sensor technology, such as CMOS, CCD, or the like. Image recognition components may be provided to process the image data. For example, such components can support functionalities including, but not limited to, barcode detection, facial recognition, camera parameter control, etc.

Network interface(s) 626 may be regarded as a specialized form of an input-output interface. One or more network interfaces 626 may be used to engage with various communications network types 604. For example, multiple network interfaces may be employed to allow for the communication over broadcast, multicast, and/or unicast networks. Through a communications network 604, the PPS controller 600 is accessible through remote clients 602B (e.g., computers with web browsers) by users 602A. Network interfaces 626 may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed PPS architectures may similarly be employed to pool, load balance, and/or otherwise increase the communicative bandwidth required by the PPS controller 600.

In some implementations, the network interfaces 626 may be communicatively coupled to hardware components, which facilitate detection of payment cards. For example, the network interfaces 626 may couple to a payment card slot or rail designed to accept payment cards through swipe or insertion or any other action. In another example, the network interfaces 626 may couple to one or more sensors included to detect presence of payment card or a tap of the payment card onto a surface of the PPS controller 600.

In various embodiments, the network interface 626 may also support wireless data transfers between the PPS controller 600 and external sources, such as clients 602B and cameras, or the like. Wireless protocols may include Wi-Fi (e.g. IEEE 802.11a/b/g/n, WiMax), Bluetooth or Bluetooth low energy (BLE); infrared, and the like, through BLE interface, WiFi interface, QR interface, NFC interface, EMV interface, cellular technology interface, and other interface(s), described subsequently.

According to one implementation, BLE interface ("BLE") 632 is configured to work on Bluetooth® or BLE® protocol to facilitate communication with a BLE transceiver installed on other devices. In one implementation, BLE is intended for low-power and low-latency applications for wireless devices within a short range, such as up to about 50 meters. BLE interface 632 may be used in applications requiring intermittent communications, smaller amounts of data transfer and bandwidths, and/or low duty cycles. BLE interface 632 can be configured to use only a fraction of the power as compared to other interfaces. In many cases, BLE interface 632 may be able to operate more than a year on the power source without charging.

BLE interface 632 is capable of being paired with a peripheral device, such as card reader 606, a payment card, or a client 602B associated with a user 602A, thus allowing the PPS controller 600 to (a) serve as a "beacon" and broadcast data and/or (b) become a relay point between the controller 600 and payment card, card reader 606 or a client 602B serving as a point of sale terminal for a merchant. The BLE interface 632 allows the controller 600 with BLE interface 632 can be placed at merchant locations, museums, ski resorts, state parks, entertainment venues, parking garages, etc.

As defined herein, a beacon is a short range communication device having a known or fixed location that provides a signal that can be detected by mobile devices within proximity of the beacon. For example, BLE interface 632 can transmit a radio frequency (RF) signal that includes its position coordinates (e.g., latitude, longitude), which can be detected by a mobile device. Alternatively, BLE interface 632 can transmit other data, such as payment proxy related to the financial account information of the user 602B (explained with reference to FIGS. 4A, 4B, and 6).

PPS controller 600 as BLE beacon allows for constant, scheduled or random scanning of other Bluetooth peripherals and devices. In one implementation, a component, such as BLE interface component, within the PPS controller 600 and/or the client 602B can be set to run in the background under a BLE protocol, persistently, intermittently or on activation monitoring for a significant change in location and/or presence of an appropriate BLE peripheral or beacon at a merchant or vendor location. BLE beacon also allows for persistent or intermittent transmission of data. For example, BLE beacon may persistently transmit or receive information related to payment proxy associated with the client 602B or PPS controller 600.

When the owner or user of the client 602B or payment card enters a store having PPS controller 600 as a point of sale terminal, he or she would get in the BLE network radius of the PPS controller 600. PPS controller 600 then serves as a bidirectional conduit for the card reader 606 to communicate with the CPU 624 collecting or handling the credit card transaction. Along with receiving transaction data or any other data by the BLE interface 632, the PPS controller 600 may also encrypt, decrypt, or store the data for future processing. It does these actions in addition to running the payment application itself, which may display items for sale, up-sell based on purchases, allow confirmation of purchases, application of coupons, the ability to provide feedback, etc.

In one implementation, the PPS controller 600 or the client 602B may be connected to a BLE peripheral device having BLE interface 632 functionalities. In some implementations, the payment card may include a chip supporting BLE functionalities. A control logic unit (not shown) may also be included to bridge BLE interface either to ISO 7816 contact interface or ISO 14443 contactless interface to provide for autonomous bi-directional data transfer between paired devices. In one implementation, the controller 600 is capable of communicating using Bluetooth, and is thus able to pair with a peripheral device 610 to obtain payment object information from a phone that at least has Bluetooth capabilities. In one implementation, a plurality of BLE peripheral devices may be connected via the BLE protocol, or other communication network, to form a mesh network. Such a mesh network may allow for transfer of data between the peripheral devices, even those that are more than the distance prescribed by the BLE protocol.

Similar to BLE beacons, data can be exchanged using other kind of RF beacons, infrared beacons, cellular communications (CDMA, GSM, LTE, etc.), beacons, pattern generation beacons, such as barcodes, Quick Response (QR) codes, or a radio frequency identifier (RFID) tag. QR code or NFC may have short range but high accuracy; Wi-Fi or Bluetooth may have mid-range and medium accuracy; and cellular may have long-range but low accuracy. In some embodiments, the controller 600 can receive and permanently store payment information so that the controller 600 acts as a payment object that does not require a payment card or other payment object to be present.

In one example, an NFC interface 634 ("NFC") can allow for close range communication using standards such as ISO 18092, ISO 21481, TransferJet® protocol and in compliance with FIME certifications. Close range communication with the NFC interface may take place via magnetic field induction, allowing an NFC interface chip 634 to communicate with other NFC devices or to retrieve information from tags having RFID circuitry via the NFC interface. In instances where it is desired to read an NFC enabled payment object, or an NFC enabled payment object is determined to be in proximity to the card reader 606, the CPU 616 may be configured to drive antenna 645 via a driving circuit (not shown) to induce a magnetic field capable of being modulated by the NFC enabled payment object. From here, the modulated magnetic field signal may be converted into a digital signal that CPU 616 can interpret via the NFC component 672. On the other hand, when it is desired to transmit data via antenna 645, CPU 616 may be configured to disable the driving circuit and transmit data using the NFC protocol by instructing a NFC modulator (not shown) to modulate the magnetic field to which antenna 645 is operatively coupled. In some embodiments, there can be a switch within the NFC modulator to turn on or off the load applied to the antenna 645. The switch can be under the control of the CPU 616. In some embodiments the antenna 645 can drift from a desired frequency (become detuned). This can be the result of a metal object being in the proximity of device 610 or controller 600. The monitor circuit (not shown) can monitor the frequency of the antenna 645, and determine when the frequency of the antenna 645 has drifted away from the desired frequency. When the it is determined that the NFC antenna 645 is out of tune, NFC antenna monitor circuit can work in concert with the CPU 616 to vary one or parameters such as capacitance, voltage, or impendence of the antenna 645 to tune the NFC antenna 645.

In another example, an EMV interface 636 ("EMV") can allow the PPS controller 600 to accept Chip and PIN cards follow technical standards more formally known as EMV, after Europay, MasterCard and Visa (EMV). In one implementation, the EMV interface complies with EMV's Level 1, Level 2 and Level 3 certifications. In some instances, CPU 616 receives payment data read by the EMV interface 636 via the card contacts (not shown), or alternatively from a magnetic stripe reader reading payment data from a magnetic stripe card. The payment data received at the CPU 616 is stored, either temporarily or permanently, in memory 614 of the controller 600. The payment data stored in memory can then be transmitted via the NFC antenna 618. The network interfaces 626 may work in conjunction with components explained later.

In other implementations, a plurality of beacon technologies may be used based on specific accuracy or power requirements. Such technologies may be combined based on weight or some other relationship. In yet another implementation, selections may be made based on user preference or availability of the beacon technology at that time. For example, the PPS controller 100 may be configured to provide and detect a plurality of beacons. For example, if a camera is on, a QR code on the client 102B display may be read, for example to pair two payment devices. If only cellular is on, a modem may detect a femtocell may be nearby. The client 602 B, such as a merchant's register or point of sale terminal, may combine data from the multiple beacons and use such data for analysis of transactions over a course of time. For example, the customer device 602B may be configured to use Wi-Fi RSSI/RTT and BT RSSI/RTT measurements from a first beacon, QR code value from a second beacon, and WiFi RSSI and cellular measurements from a third beacon for accurately identifying and establishing secured connections with the customer device 602B.

The beacons can be dynamic with data and other beacon parameters changing as per environment or the type of device pairing with the PPS controller 100; in other implementations, the beacons can be static and displayed using LED displays, electronic displays, or the like, described with reference to I/O interface.

In one embodiment, the PPS controller 600 may also be connected to and/or communicate with entities such as, but not limited to: one or more users, for example users 602A, associated with user input devices 605; one or more users 602A through their respective customer devices 602B; peripheral devices 610; an internal or external cryptographic processor device 631; and/or a communications network 604.

Communications Network

The network 104 can include any combination of local area and/or wide area networks, using both wired and wireless communication systems. In some embodiments, the network 604 uses standard communications technologies and/or protocols. Thus, the network 604 can include links using technologies such as Ethernet, 802.11, a Wi-Fi, a Bluetooth network; and/or the like worldwide interoperability for microwave access (WiMAX), 3G, 4G, CDMA, digital subscriber line (DSL), etc. Similarly, the networking protocols used on the network 608 may include multiprotocol label switching (MPLS), transmission control protocol/Internet protocol (TCP/IP), hypertext transport protocol (HTTP), and/or file transfer protocol (FTP). Data exchanged over the network 608 can be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec). Additionally, the communication network may be a mesh network. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP.

Clock

Clock 638 may have a crystal oscillator that generates a base signal through the PPS controller's circuit pathways. The clock 638 may be coupled to the system bus 620 and various clock multipliers that increase or decrease the base operating frequency for other components interconnected in the PPS controller 600.

Power Source

The PPS units 612 may also include a power source 640. The power source 640 may be of any form capable of powering small electronic circuit board devices such as the following power cells or batteries: alkaline, lithium hydride, lithium ion, lithium polymer, nickel cadmium, solar cells, and/or the like. Other types of AC or DC power sources may be used as well. The power source 640 is connected to at least one of the interconnected subsequent components of the PPS controller 600 thereby providing an electric current to all subsequent components. In one example, the power source 640 is connected to the system bus 604. In an alternative embodiment, an outside power source 640 is provided through a connection across the I/O 622 interface. For example, a USB connection can carry both data and power across the connection and is therefore a suitable source of power. To this end, coupled to power source 640 may be a USB micro interface (not shown) configured to receive a USB micro jack, although other types of connectors are anticipated. In certain embodiments, connection of a jack to USB micro interface can activate a switch within power source 640 to override power supplied by the battery. This allows for battery power to be conserved for situations where external power cannot be provided. Furthermore, power source 640 may also include a battery charger to allow the battery to be charged when external power is supplied via USB micro interface.

In one implementation, the power source 640 may include a selector (not shown) to selectively power one or more units within the PPS controller 600. For example, the power source 640 may power the BLE network interface and BLE component and power the CPU 616 only on receiving a wake up signal, using an activation signal, triggered by a tactile, visual, or audio input. To this end, the PPS controller 600 may include wake-up electronics (not shown) configured to wake-up the PPS controller 600 from a low-power state to an active state in response to detection of a payment object. In some embodiments, wake-up electronics can also power down PPS controller 600 to a low-power state after a predetermined amount of time or after completion of a communication.

Cryptographic Processor

A cryptographic processor 642 and/or transceivers (e.g., ICs) 644 may be connected to the system bus 620. In another embodiment, the cryptographic processor and/or transceivers may be connected as either internal and/or external peripheral devices 610 via the I/O interface bus 622. To this end, the transceivers 644 may be connected to antenna(s) 645, thereby enabling wireless transmission and reception of various communication and/or sensor protocols. For example the antenna(s) may connect to a transceiver chip or a wireless microcontroller targeting Bluetooth applications, e.g., providing 802.11n, Bluetooth 4.2, Bluetooth 2.1+EDR, FM, GSM/EDGE/GPRS/2G/3G/HSDPA/HSUPA/LTE (4G) communications, global positioning system (GPS) thereby allowing PPS controller 600 to determine its location, for example. A separate GPS unit 646 (also referred to as the location component) may be used to determine the location of a merchant or customer performing a payment transaction using a payment card. The GPS unit may work on any of the protocols mentioned above. The location information may be used to advertise location specific information to the user.

Furthermore, the communicative instructions may be stored and/or transmitted in batches (e.g., batches of instructions) as programs and/or data components to facilitate desired operations.

Peripheral Devices

Peripheral devices 610 may be connected and/or communicate to I/O interface 622 and/or other facilities of the like such as network interfaces, storage interfaces, directly to the interface bus 618, system bus, the CPU, and/or the like. Peripheral devices 610 may be external, internal and/or part of the PPS controller 600. Peripheral devices 610 may include: antenna, audio devices (e.g., line-in, line-out, microphone input, speakers, etc.), cameras (e.g., still, video, webcam, etc.), dongles (e.g., for ensuring secure transactions with a digital signature, and/or the like), external processors (for added capabilities; e.g., crypto devices 631), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like.

A card reader, similar to card reader 606, may be connected to the PPS controller 600 as a peripheral device. The card reader may comprise user interfaces, such as, for example, a PC/SC EMV L1/L2/NFC certified Smart Card Reader, a keypad for PIN entry, such as key keypad, a display, such as the illustrated LCD display, etc., and electrical interfaces, an interface for back-up battery power, an interface for a display, a power interface, LED lights for indicating status of a transaction, a buzzer, etc. The card reader may be, for example, PCI v3 compliant and configured to facilitate the acceptance of credit/debit card payments.

A biometric sensor or reader 690 may be included. In some embodiments, the biometric reader device 690 may include a fingerprint reader. In other embodiments, the biometric reader device 690 may include a retinal scanner. The payment device includes conventional electronic circuits for storing and processing data, and for wireless communication with the POS device. An electronic biometric reader is physically integrated into the payment device. The biometric reader may, for example, be a fingerprint reader or a voice print reader. The biometric reader is used to acquire biometric measurements of the person who is attempting to make the proximity payment. The acquired biometric measurements are electronically processed internally or within the payment device to confirm whether the attempting person is an authorized or registered user of the payment device. For this purpose, the acquired biometric measurements may be compared with stored biometric records of the authorized or registered users. Thus, the payment device can self-validate itself for use by the attempting person according to the results of the internal comparison.

The biometric reader may either be separately connected to the PPS controller 600 as a dongle or it may be in the same housing as the card reader 606 or the PPS controller 600. In the housing, a biometric reader is embedded in a plastic base or cover. The biometric reader may, for example, be an electronic fingerprint measurement device, which relies on surface capacitance measurements to record fingerprints. Fingerprint measurement device may be embedded in a plastic base or cover with a measuring surface. Fingerprint reader also may include suitable measurement/processing electronics (e.g., a microprocessor or ASIC chip) and electronics for wireless communications (e.g., a RF transceiver), which also are disposed in base. The electronics may be powered by a dry cell battery embedded in base (not shown). Alternatively, the electronics may be powered inductively by suitable radio frequency signals generated by a POS device, for example, in the same manner as commonly used passive RFID tags are powered by RFID tag readers. A finger guide or template, which guides the payer's finger to a suitable measurement position on surface is attached to plastic sleeve. Housing may further include an eyelet or other mechanical feature for payer convenience, for example, in carrying the sleeve arrangement on a key ring or chain. Even though the description relates to fingerprint reader, it will be understood that retinal scanners and voice recognition systems can also be incorporated in a similar manner.

Peripheral devices 610 may also include sensors, devices, and subsystems can be coupled to network interface to facilitate multiple functionalities. For example, motion sensor, magnetic, light sensor, and proximity sensor can be coupled to network interface to facilitate orientation, detection, lighting, and proximity functions of the PPS controller 600, by analyzing any input, such as audio, visual, tactile, mechanical, electrical, magnetic, hydraulic, electromagnetic input, and the like. Location processor (e.g., GPS receiver similar to GPS 646) can be connected to the network interface to provide geo-positioning. Motion sensor can include one or more accelerometers configured to determine change of speed and direction of movement of the PPS controller 600. Magnetic sensors may detect presence or absence of a payment card and differentiate a payment card from other cards.

Peripheral devices 610 may also include a camera subsystem and an optical sensor, e.g., a charged coupled device (CCD) or a complementary metal-oxide semiconductor (CMOS) optical sensor, can be utilized to facilitate camera functions, such as recording photographs and video clips.

Peripheral devices 610 may also include an audio subsystem can be coupled to a speaker and a microphone to facilitate voice-enabled functions, such as voice recognition, voice replication, digital recording, and telephony functions. Audio subsystem can be configured to receive voice commands from the user.

Peripheral devices 610 may also include an I/O subsystem that can include touch surface controller and/or other input controller(s). Touch surface controller can be coupled to a touch surface or pad. Touch surface and touch surface controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface. Touch surface can include, for example, a touch screen.

Other input controller(s) can be coupled to other input/control devices, such as one or more buttons, rocker switches, thumb-wheel, infrared port, USB port, and/or a pointer device such as a stylus. The one or more buttons (not shown) can include an up/down button for volume control of speaker and/or microphone.

In one implementation, a pressing of the button for a first duration may disengage a lock of the touch surface; and a pressing of the button for a second duration that is longer than the first duration may turn power to PPS controller 100 on or off. The user may be able to customize a functionality of one or more of the buttons. The touch surface can, for example, also be used to implement virtual or soft buttons and/or a keyboard. The touch surface may also activate the PPS controller to actively relay information. At all other times, the PPS controller 100 may be dormant to conserve power.

User input devices 605 often are a type of peripheral device 110 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like. The card readers, as mentioned before, may be configured to read a variety of payment cards. Such card readers may either be dongle like or puck style.

Cryptographic units such as, but not limited to, microcontrollers, processors 616, interfaces 618, and/or devices 631 may be attached, and/or communicate with the PPS controller 600. Cryptographic units support the authentication of communications from interacting agents, as well as allowing for anonymous transactions. Cryptographic units may also be configured as part of the CPU.

It should be noted that although user input devices 605 and peripheral devices 610 may be employed, the PPS controller 600 may be embodied as an embedded, dedicated, and/or monitor-less (i.e., headless) device(s), wherein access would be provided over a network interface connection. Additionally, part or all peripheral devices may be integrated within the PPS controller 600.

Memory

Memory 614 may further include, but is not limited to, one or more components 648 that include programs that supplement applications or functions performed by the PPS controller 600, database 650, operating system 652, random access memory (RAM) 654, read only memory (ROM) 656, and storage device 630, etc., into which data may be saved that serves, amongst other things, as repository for storing data pertinent to functioning of the components.

The PPS controller 600 may employ various forms of memory 614, such as ROM 654, and a storage device 630. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like.

PPS Components

The memory 614 may contain a collection of program and/or database components and/or data such as, but not limited to: operating system component(s) 652 (operating system); information server component(s) 658 (information server); user interface component(s) 608 (user interface); Web browser component(s) 660 (Web browser); database(s) 650; cryptographic server component(s) 662 (cryptographic server); the pairing component(s) 64; and/or the like (i.e., collectively a component collection). These PPS components 648 may be stored and accessed from the storage devices and/or from storage devices accessible through an interface bus 618.

Operating System

The operating system component 652 is an executable program component facilitating the operation of the PPS controller 600. The operating system can facilitate access of I/O, network interfaces, peripheral devices, storage devices, and/or the like. In various embodiments, any number of current or future operating systems may be supported such as: any highly fault tolerant, scalable, portable, ROM-able, real-time, deterministic, multitasking and secure kernels systems, e.g., μC/OS-III, μC/OS-III, Apple Macintosh OS X (Server); Unix and Unix-like system distributions; Linux distributions; limited and/or less secure operating systems, e.g., AppleMacintoshOS, MicrosoftWindows XP, Windows Server2003, Windows Server 2008, Windows Server2012, Windows Vista®, Windows 7, and Windows 8, Blackberry OS (e.g., Blackberry 10), Firefox OS, Sailfish OS, Tizen, Ubuntu Touch OS, Chrome OS, iPhone OS (e.g. iOS), WindowsMobile (e.g. Windows 10 Mobile), Google Android (e.g. Lollipop 5.1); and/or the like. In various embodiments of the present subject matter, the operating system may be a multi-threaded multi-tasking operating system. Accordingly, inputs and/or outputs from and to a display and inputs/or outputs to physical sensors may be processed in parallel processing threads. In other embodiments, such events or outputs may be processed serially, or the like. Inputs and outputs from other functional blocks may also be processed in parallel or serially, in other embodiments, such as image acquisition device and physical sensors.

The operating system 652 may provide communications protocols that allow the PPS controller 600 to communicate with other entities through a communications network 613. Various communication protocols may be used by the PPS controller 600 as a subcarrier transport mechanism for interaction, such as, but not limited to: multicast, TCP/IP, UDP, unicast, and/or the like.

Information Server

The information server 658 may: support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols; provide results in the form of Web pages to Web browsers; and allows for the manipulated generation of the Web pages through interaction with other program components.

Web Browser

A Web browser component 660 is a stored program component that is executed by a CPU. The Web browser may be a hypertext viewing application such as Google Chrome or Macintosh Safari. Web browsers and like information access tools may be integrated into PDAs, cellular telephones, and/or other mobile devices. Also, in place of a Web browser and information server, a combined application may be developed to perform similar operations of both. The combined application would similarly affect the obtaining and the provision of information to users, user agents, and/or the like from the enabled nodes. The web browser may be coupled to a web server (not shown). In other implementations, the PPS controller 600 may host a website (hereinafter, "system website") that includes one or more graphical user interfaces (GUIs) for organizing and presenting content to users. For example, through the system web site, users create account logins to connect to their social identities (e.g., social profiles or social accounts), read content (e.g., messages, comments, posts), create or post content, communicate in real-time with other users (e.g., chat), and/or otherwise engage or interact with other users of the system website (e.g., "friends," "followers," "social contacts," or other types of social network connections). In some embodiments, the user interactions on the system website lead to internal API communication, which involves the PPS controller 600 monitoring the user interactions for an indication of an intent to transfer money, sending, in response to such indication, requests (e.g., POST or GET requests) to the API of the server(s) to query the database(s) 650, and displaying the data returned by the API of the server(s) as appropriate. The indication of the intent is determined may be based on an identification of a user input, e.g., a string of characters, that has a particular syntax, the syntax being a monetary indicator preceding one or more alphanumeric characters. The user input having the syntax operates as a trigger to send money to a payment proxy represented by the user input.

User Interface

The user interface 608 may allow for the display, execution, interaction, manipulation, and/or operation of program components and/or system facilities through textual and/or graphical facilities through one or more interaction interface elements, such as check boxes, cursors, menus, scrollers, and windows (collectively and commonly referred to as widgets) to facilitate the access, capabilities, operation, and display of data and computer hardware and operating system resources, and status. Graphical user interfaces (GUIs) 608 may be used to provide a baseline and means of accessing and displaying information graphically to users. The user interface may also be a graphic user interface as provided by, with, and/or atop operating systems and/or operating environments such as already discussed.

Cryptographic Server

A cryptographic server component 662 is a stored program component that is executed by a CPU 616, cryptographic processor 642, cryptographic processor interface 628, cryptographic processor device 631, and/or the like, to enable encryption schemes allowing for the secure transmission of information across a communications network to enable the PPS. components to engage in secure transactions. The cryptographic server 662 facilitates the secure accessing of resources on the PPS and facilitates the access of secured resources on remote systems; i.e., it may act as a client and/or server of secured resources. Cryptographic processor interfaces 628 can allow for expedition of encryption and/or decryption requests by the cryptographic component. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5), which is a one way hash operation), passwords, Secure Socket Layer (SSL), Secure Hypertext Transfer Protocol (HTTPS), and/or the like. Employing such encryption security protocols, the PPS controller 600 may encrypt all incoming and/or outgoing communications.

The PPS controller 600 may be associated with a secure enclave unit (not shown) that may represent any logic, circuitry, hardware, or other structures for creating and maintaining a secured, protected, or isolated environment, in which an application or other software may run, execute, be loaded, or otherwise be present an information processing system. The secure enclave unit may further include encryption unit (not shown), which may include any logic, circuitry, or other hardware to execute any one or more encryption algorithms and the corresponding decryption algorithms, and may include logic, circuitry, or other hardware shared with another encryption unit in processor. In one embodiment, the secure enclave unit includes the digital signatures, and biometric payment instruments created thereof.

PPS Database

The PPS database component 650 may be a fault tolerant, relational, scalable, secure database, such as Oracle or Sybase. Alternatively, the PPS database 650 may be implemented using various data-structures, such as an array, hash, (linked) list, struct, structured text file (e.g., XML), table, and/or the like. Such data-structures may be stored in memory and/or in structured files. In another alternative, an object-oriented database may be used. Also, the database may be implemented as a mix of data structures, objects, and relational structures.

In one embodiment, the database 650 includes several data tables 650A-H. A fingerprint image data table 650a includes fields such as, but not limited to: fingerprint image, fingerprint minutiae set 6501, ridge count, and/or the like. A location data table 650b includes fields such as, but not limited to: location of the PPS controller, location of clients 602B, coupons at the location, distance between the client 602B and the PPS controller 600, and/or the like. A transaction data table 650C includes fields such as, but not limited to: transaction information, purchases made, purchase history, price of the product, and/or the like.

A biometric data table 650D includes fields such as, but not limited to: biometric data received from the user 602A. A financial data table 650E includes fields such as payment card information connected to the biometric data, amount charged to the payment card, manner of receiving payment card (swipe, tap, etc.), offline/online mode, etc. A sensor data table 650E includes fields such as, but not limited to: payment card detected, payment card received, beacon activated, beacon deactivated, etc. The other data table 650F stores any other data generated by the PPS component(s) 648. For example, mapping tables storing association between the biometric data and the financial data, or the relationship between tokens 650G and the digital signature stored in 650H.

In one embodiment, specific tables may be created when each of the components are executed. Furthermore, the tables may be stored temporarily or permanently in the database 650.

PPS Components

The PPS component(s) 648 is a stored program component that is executed by the CPU 616. In one embodiment, the PPS component 648 incorporates any and/or all combinations of the aspects of the PPS controller 600 that was discussed in the previous figures. As such, the PPS controller 600 affects accessing, obtaining and the provision of information, services, transactions, and/or the like across various communications networks.

Examples of PPS components include, but are not limited to, API Component 671, Signature component(s) 664, Payment component(s) 666, POS component(s) 668, Location component(s) 670, API component 671, Digital Signature component(s) 672, mapping component(s) 674, and other component(s) 676. The signature component 664 receives data from the biometric characteristics scanned by the user during registration or a buyer during a purchase transaction. The payment component 666 may allow and enable the PPS controller 600 to accept the biometric characteristics as valid payment instruments once the registration is confirmed. The POS component 668 may allow and enable the PPS controller 600 to accept biometric data, e.g., from the fingerprints, and process or transfer the transaction data to an external server, such as a payment processing system and financial network system, to obtain financial account information of users to fulfill a transaction. The location component(s) 670 tracks the user's mobile device and the merchant point of sale device to push information based on proximity through for example, short-range communication networks, such as Bluetooth, BLE, and NFC technologies. The digital signature component 672 creates a digital signature of the data received from the biometric characteristics and converts it into tokenized information. Not all data is used. The API component 671 allows and enables the PPS controller 600 to create APIs for functionalities such as creating receipts, associating rewards, recording loyalty points, etc. The mapping component(s) 6 may allow and enable the PPS controller 600 to map the digital signatures to financial accounts of merchants or customer profiles. The mapping component 674 may also allow the PPS controller 600 to generate a dynamic digital signature based on a randomly generated token changing with time of day, merchant location, etc. The other component(s) 676 may enable and allow processing of data/signals required by the PPS controller 600.

The structure and/or operation of any of the PPS controller 600 components may be combined, consolidated, and/or distributed in any number of ways to facilitate development and/or deployment. To this end, one may integrate the components into a common code base or in a facility that can dynamically load the components on demand in an integrated fashion. The components may be consolidated and/or distributed in countless variations through standard data processing and/or development techniques. Multiple instances of any one of the program components may be instantiated on a single node, and/or across numerous nodes to improve performance through load-balancing and/or data-processing techniques. Furthermore, single instances may also be distributed across multiple controllers and/or storage devices; e.g., databases.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components. The grammar syntax itself may be presented as structured data that is interpreted and/or otherwise used to generate the parsing mechanism. Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

Regarding the process 300, 400, 450, and 500, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further, any specific numbers noted herein are only examples; alternative implementations can employ differing values or ranges.

While aspects of the described subject matter can be implemented in any number of different systems, circuitries, environments, and/or configurations, the embodiments are described in the context of the following exemplary system(s) and configuration(s). The descriptions and details of well-known components are omitted for simplicity of the description. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof. Some recurring terms are now described. These definitions should not be considered limiting.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, note that the terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

In some implementations, the network(s) may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks may include both wired and/or wireless communication technologies, including Bluetooth®, Bluetooth® low energy, Wi-Fi and cellular communication technologies like worldwide interoperability for microwave access (WiMAX), 3G, 4G, CDMA, digital subscriber line (DSL), etc., cloud computing technologies, as well as wired or fiber optic technologies. Additionally, the communication network may be a mesh network. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

The term "component," "module" or "engine" refers broadly to general or specific-purpose hardware, software, or firmware (or any combination thereof) components. Components and engines are typically functional components that can generate useful data or other output using specified input(s). A component or engine may or may not be self-contained. Depending upon implementation-specific or other considerations, the components or engines may be centralized or functionally distributed. An application program (also called an "application") may include one or more components and/or engines, or a component and/or engine can include one or more application programs.

What is claimed is:

1. A method for processing a transaction, the method comprising:
   receiving, by a merchant device associated with a first user, information regarding the transaction;
   receiving, by a biometric sensor communicatively coupled to the merchant device, biometric data of a second user;
   generating, by the merchant device, a biometric signature based at least in part on the biometric data;
   sending, by the merchant device, the information and the biometric signature to a customer device associated with the second user;
   determining, by an application residing on the customer device, a similarity between the biometric signature and a registered biometric signature stored in association with the customer device, the similarity based at least in part on a comparison of the biometric signature with the registered biometric signature;
   determining, by the merchant device, that the biometric data corresponds to a fingerprint;
   selecting, by the merchant device, an account associated with the registered biometric signature from multiple accounts based at least in part on determining that the biometric data corresponds to the fingerprint;
   generating, by the application and based at least in part on the similarity, a request for approval by the payment processing system of the transaction utilizing the account;
   sending, by the application, the request to a payment processing system; and
   receiving, from the payment processing system and at the customer device, a transaction approval indicating the payment processing system has approved use of the account to settle the transaction.

2. The method of claim 1, further comprising identifying the customer device based at least in part on a geographical proximity of the customer device to a geographical location of the merchant device.

3. The method of claim 2, wherein the identifying the customer device further comprises:
   determining, by the merchant device, a proximate area around the geographical location of the merchant device; and
   determining that the customer device is located within the proximate area.

4. The method of claim 1, wherein generating the digital signature comprises:
   extracting features of the biometric data in the form of discrete cosine transform coefficients; and
   creating feature vectors based at least in part on the discrete cosine transform coefficients.

5. The method of claim 1, further comprising:
   determining, by the merchant device, a first location associated with the customer device; and
   determining, by the merchant device, that a second location associated with the biometric sensor is within a threshold proximity to the first location associated with the customer device, wherein obtaining the transaction approval is based at least in part on the second location being within the threshold proximity to the first location.

6. The method of claim 1, wherein the registered biometric signature includes a model of previously-obtained biometric data.

7. A system, comprising:
   a biometric sensor; and
   a merchant device communicatively coupled to the biometric sensor, the merchant device comprising one or more non-transitory computer-readable media storing computer-executable instructions that, when operated by a processor, perform operations comprising:
      receiving information regarding a transaction;
      receiving, via the biometric sensor, biometric data associated with a user;
      determining that the biometric data corresponds to a fingerprint;

selecting an account from multiple accounts based at least in part on determining that the biometric data corresponds to the fingerprint;

generating a biometric signature of the user based at least in part on the biometric data;

sending, directly or via a network connection, the information and the biometric signature to a customer device;

receiving, directly or via the network connection, an indication from the customer device that a similarity between the biometric signature and a registered biometric signature stored in association with the customer device satisfies a threshold similarity; and receiving, directly or via the network connection, an indication, that the customer device has also received, of an approval of the transaction by a payment processing service, the approval received in response to a request for approval of the transaction by the payment processing service sent by the customer device to the payment processing service based at least in part on the similarity.

8. The system of claim 7, wherein the one or more non-transitory computer-readable media further store computer-executable instructions that, when operated by the processor, perform an operation comprising detecting, using a location sensor, the customer device based at least in part on a geographical proximity of the customer device to a geographical location of the merchant device.

9. The system of claim 7, the operations further comprising:

determining a proximate area around a geographical location of the merchant device;

determining that the customer device is located within the proximate area, wherein receiving the indication of the approval is based at least in part on the customer device being located within the proximate area.

* * * * *